Aug. 9, 1949.  G. F. DALY ET AL  2,478,250
APPARATUS FOR TRAINING BOMBARDIERS
Filed June 29, 1945  12 Sheets-Sheet 5
FIG.4.a 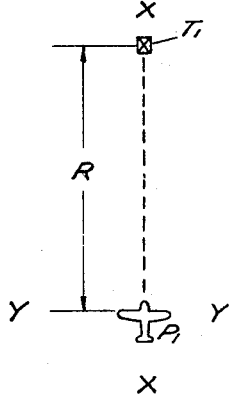
FIG.4.b 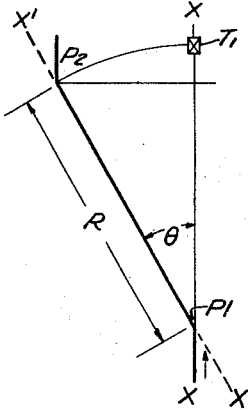
FIG.4.c 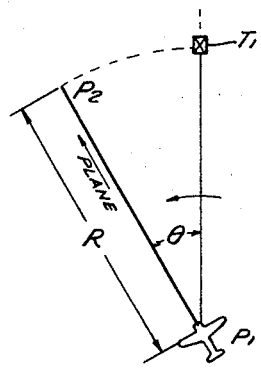
FIG.4.d 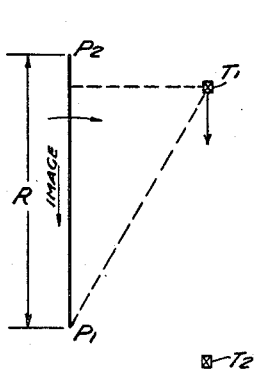
FIG.4.e 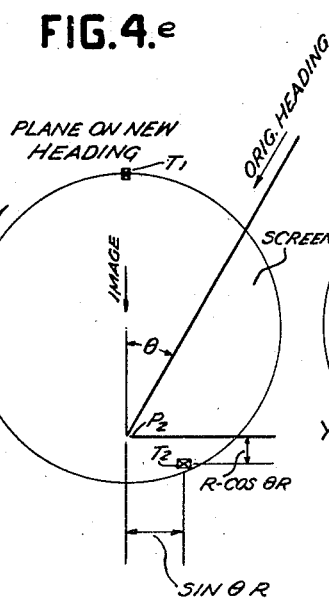
FIG.4.f 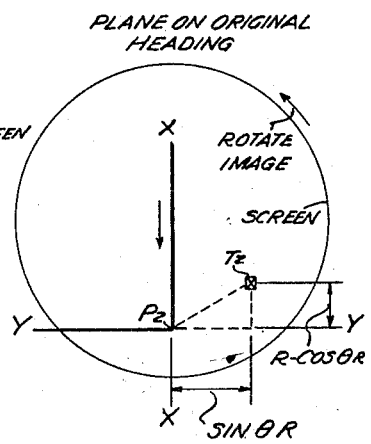
INVENTORS;
George F. Daly,
Burdette H. Phillips,
Gustav V. A. Matmros.
BY
ATTORNEY

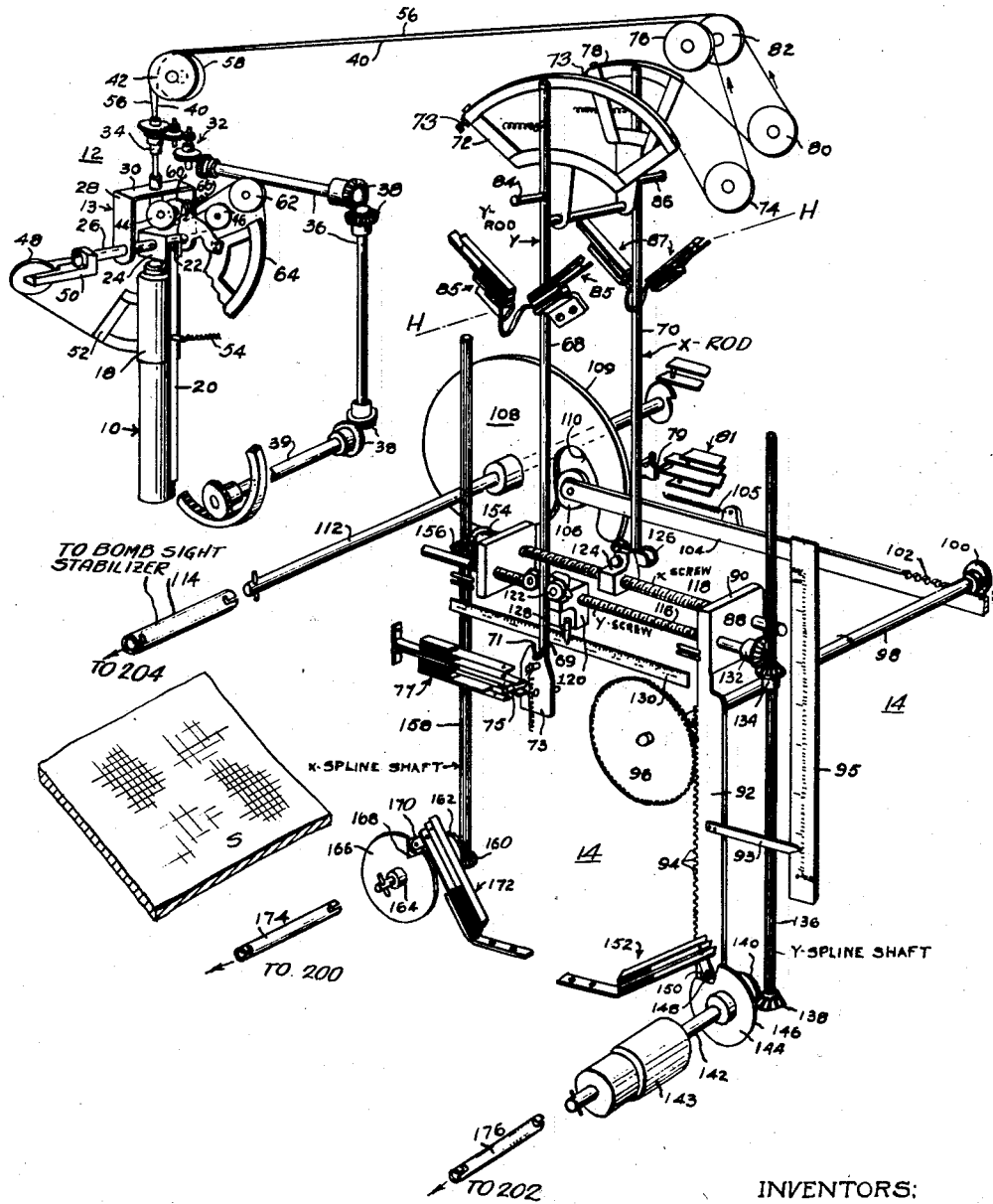

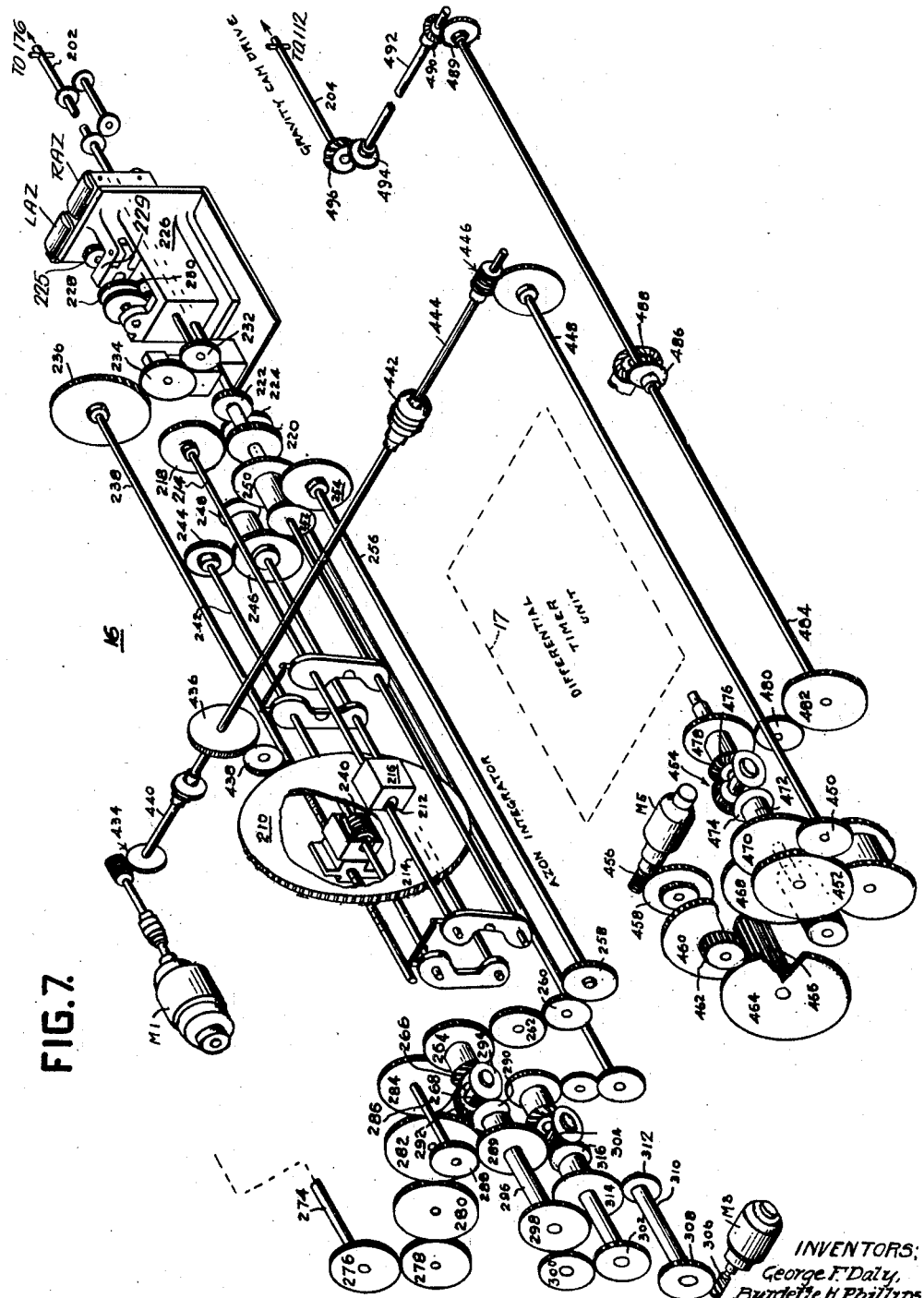

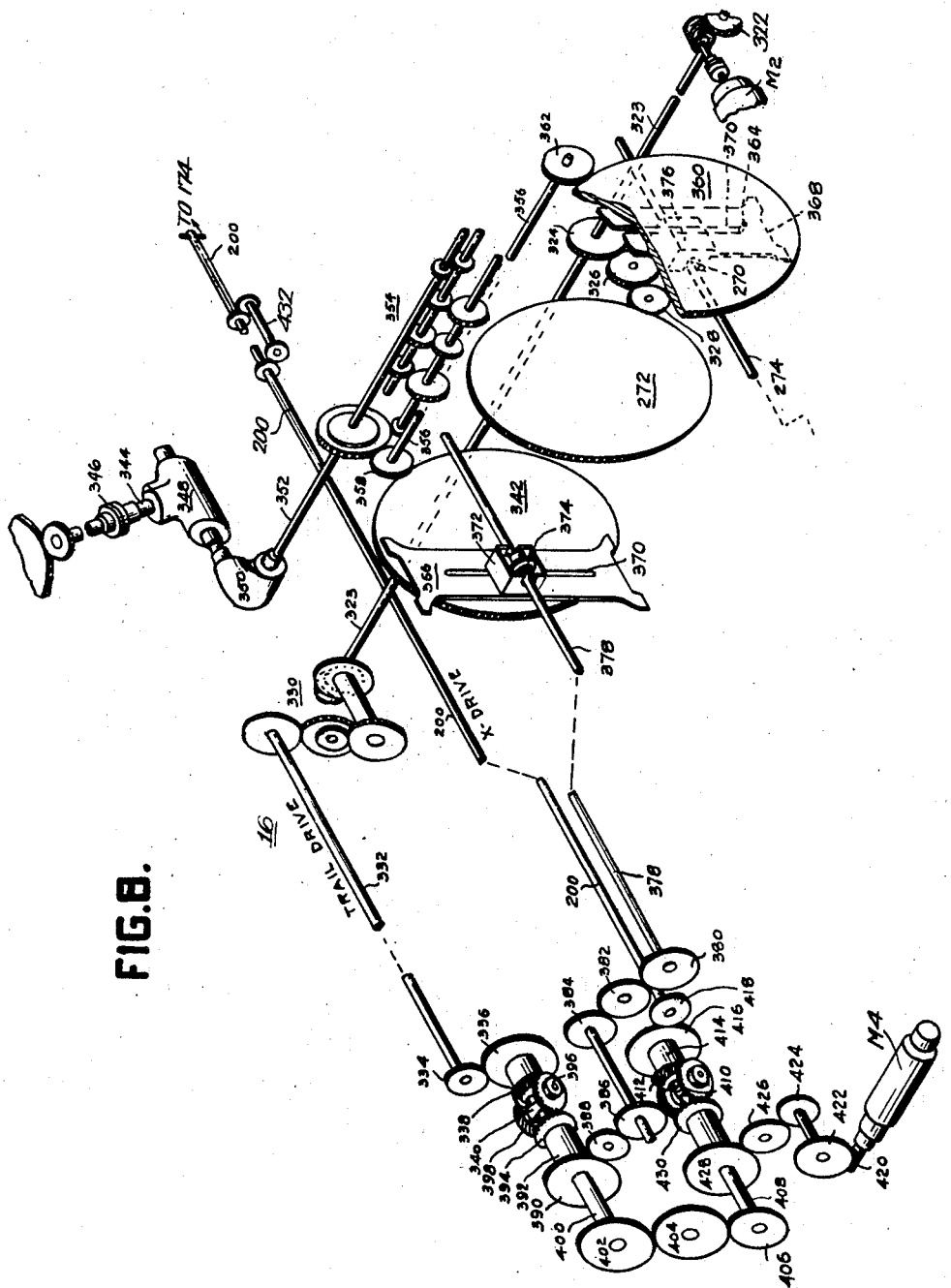

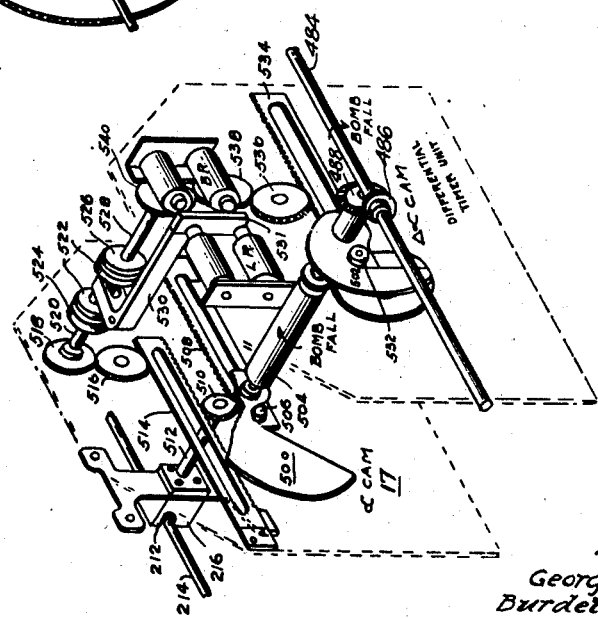

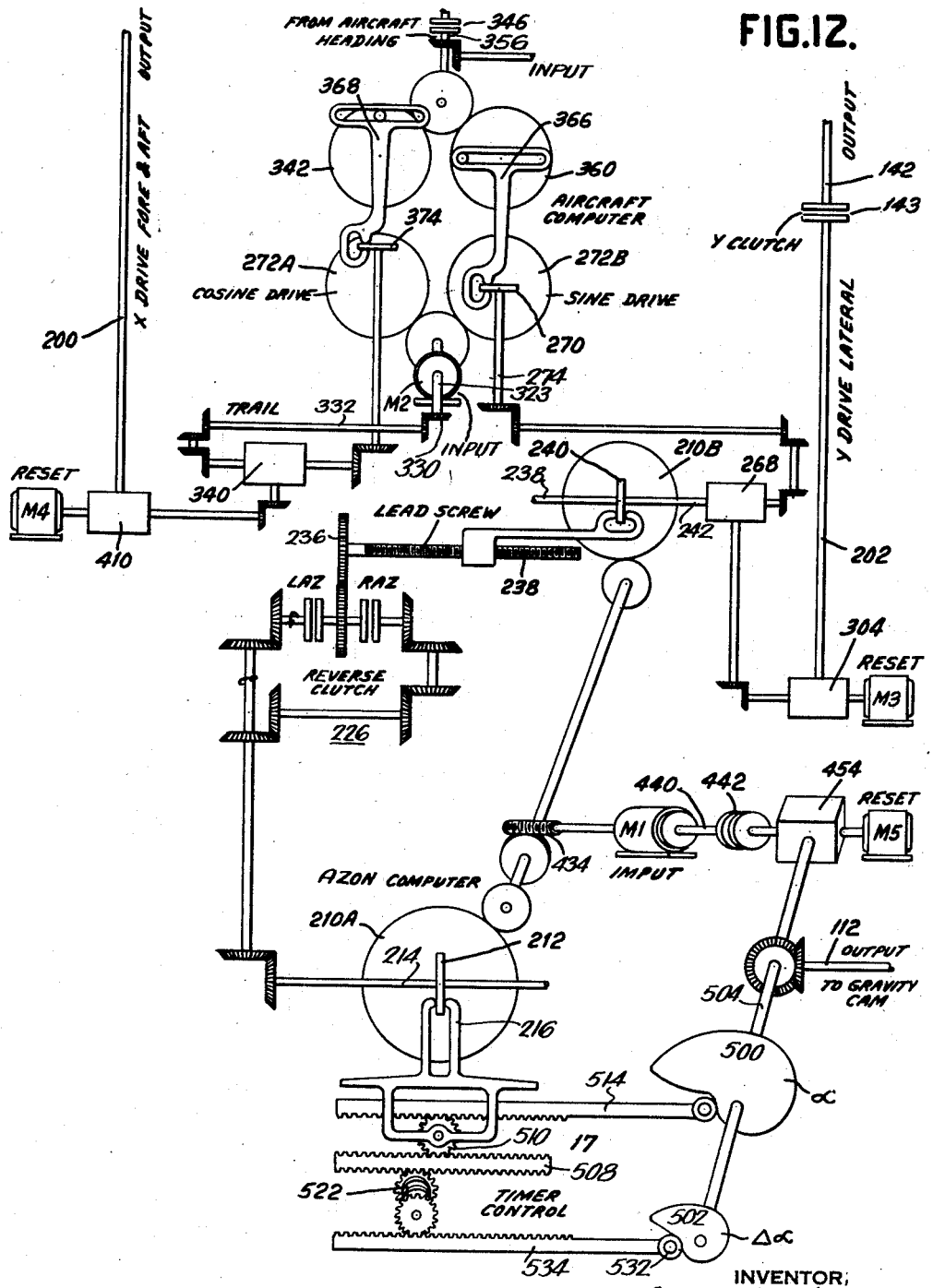

Aug. 9, 1949.   G. F. DALY ET AL   2,478,250
APPARATUS FOR TRAINING BOMBARDIERS
Filed June 29, 1945   12 Sheets-Sheet 12

Inventors,
GEORGE F. DALY.
BURDETTE H. PHILLIPS.
GUSTAV V.A. MALMROS.

By William Lang
Attorney.

Patented Aug. 9, 1949

2,478,250

UNITED STATES PATENT OFFICE 2,478,250

APPARATUS FOR TRAINING BOMBARDIERS

George F. Daly and Burdette H. Phillips, Endicott, and Gustav V. A. Malmros, Binghamton, N. Y., assignors to International Business Machines Corporation, New York, N. Y., a corporation of New York Application June 29, 1945, Serial No. 602,292

4 Claims. (Cl. 35—25)

The present invention relates to training apparatus for aircraft personnel. More particularly, it relates to an auxiliary training apparatus designed for use in connection with trainers of the type disclosed in a co-pending application of George F. Daly, Serial No. 566,804, filed December 6, 1944, now Patent Number 2,475,311, for "Apparatus for training bombardiers and other aircraft personnel." Briefly, the present training apparatus is in the form of mechanism which may be installed in the above mentioned parent apparatus to simulate the student bombardier's view of the flare in the tail of an azon bomb as it falls toward the target.

The apparatus disclosed in the above mentioned application comprises a training installation for bombardiers wherein the bombardier is confronted with conditions which closely simulate those which occur during actual flying and which are intended to produce proficiency in the art of bombing. This apparatus is in the form of a bombing and dead reckoning trainer which has been designed to duplicate as closely as possible the flight of an airplane or other aircraft on an actual bombing mission, while at the same time enabling an instructor to observe the bombardier's reactions and give him valuable advice as to his procedure. The apparatus includes a bombardier's station wherein the bombardier in position with his instruments may view an image of a realistic target which appears to move toward him at a uniform velocity, the target being in the form of a panoramic moving picture projected from an overhead projection apparatus onto a screen below so that during a bombing run the bombardier may take the necessary sights, make the necessary calculations of altitude, airspeed and the like, manipulate his instruments accordingly and otherwise perform all the necessary duties that would be required of him during an actual bombing run.

The simulation of travel of the airplane or other aircraft over the earth's surface is made possible by control of the projection apparatus located above the bombardier's station. This apparatus causes the image to move across the screen in any desired direction. Since the projected image is a photographic map of a target area, motion of the target is depended upon to simulate motion as seen from a moving airplane at a predetermined altitude. Advantage is thus taken of the optical illusion experienced when one views a moving object from a stationary platform, i. e., the illusion which presents itself after a short period of time wherein it appears that the object is fixed and the platform is in motion. By means of the controls afforded the bombardier, he may cause the image to effect a turn simulating the turning of an airplane governed by both wind and speed.

The apparatus provides for changes in speed and motion of the image to correspond with changes of speed of the airplane as encountered in flight. The projector provides for motion simulating various airspeeds, but when the apparatus comprising the present invention is associated therewith a predetermined constant airspeed is assumed and provided for. The apparatus of the above mentioned application can be conditioned to simulate flight at various altitudes, but when associated with the apparatus of the present invention a predetermined constant altitude is assumed for simplicity's sake.

As previously stated, the training apparatus comprising the present invention is capable of being installed in the training apparatus briefly outlined above to simulate the bombardier's view of the flare which exists in the tail of an azon-controlled bomb after it has been released and as it falls toward the target.

Briefly, the term "azon" is associated with azimuth and an azon bomb is a standard bomb to which there has been applied a self-contained attachment or tail including, among other things, a series of four fins or rudders. Two of these rudders, which are disposed on opposite sides of the bomb, are differentially controlled by a mechanism within the bomb and they operate automatically in the manner of ailerons to maintain the bomb in a fixed angular position relative to the horizontal axis of the bomb at all times. The other two rudder members operate under the control of an U. H. F. radio receiver within the attachment to impart right and left lateral displacement to the bomb during the fall thereof. The U. H. F. radio receiver within the attachment operates, of course, under the control of an U. H. F. transmitter carried in the aircraft. The azon attachment is readily applicable to the tail end of a standard bomb, suitable mating threads being provided on the bomb and the attachment so that the latter may be screwed onto the former.

By the arrangement briefly described above, the trajectory of the bomb may be altered after it has been released from the aircraft. The control which may be applied to an azon bomb of this type will affect its lateral displacement only, the forward motion of the bomb being unaffected by any control which may be applied to the latter from the aircraft.

An azon bomb of this type is provided with a flare in the tail thereof which does not become ignited until approximately six seconds after the bomb has been released. Thereafter, when the flare is ignited it presents to the eye of the bombardier or to the observer an indication of the position of the bomb relative to the target for the remainder of the duration of the time of fall of the bomb and also relative to the aircraft from which it was dropped. Obviously, any degree of lateral control which is applied to the bomb after the same has been released will affect its lateral position relative to the target and relative to the aircraft, assuming that the latter maintains its initial course or heading after the bomb has been released. It is also obvious that any change of heading of the aircraft from which the bomb has been dropped will cause an apparent displacement of the bomb from the point of view of the bombardier.

According to the present invention, the position of an azon-controlled bomb relative to the target is simulated by means of a spot of light which is projected on the screen from a special projector, hereinafter referred to as the flare tube projector, or simply, the flare tube. The motion of this spot of light is controlled in the azon trainer mechanism by movement of the flare tube projector accordingly to indicate the effect of applying control to the bomb or of altering the heading of the aircraft during such time as the bomb is in flight. An exception exists in that no indication is given for the first six seconds, inasmuch as in an actual bomb the flare does not ignite for this period of time until after the bomb has been released.

It should be noted at this time that in order to simplify the terminology employed throughout this application, in many instances, where the meaning is clear, no specific attempt is made to differentiate by terminology alone between the actual dropping of a bomb from an aircraft in flight and the theoretical dropping of a "bomb" by the present trainer mechanism.

In the latter instance, no motion of a free falling projectile is encountered and the so-called "bomb" consists merely of a prolonged electrical impulse, which is applied to the illumination of a lamp in the flare tube projector to throw a narrow beam of light on the projection screen shortly after release of the "bomb" and of the control of its direction during the time of fall of the "bomb," so that at any time during such fall a spot of light will appear on the screen and will bear the same positional relation to the target image that an actual bomb would bear to an actual target had the bombardier in the aircraft resorted to the same calculations and manipulations resorted to by the bombardier in the training apparatus prior to, during and after release of the bomb. As far as the present invention is concerned, the flare tube unit per se constitutes the actual means for giving a visual simulation of the movement of an actual azon-controlled bomb during the time of fall thereof.

For convenience of description, the present invention may broadly be divided into two groups of instrumentalities, each comprising a single unit or mechanism. One such group includes what is termed herein as the "aspect angle unit" or "triangle unit." This unit includes the flare tube projector assembly, which is adapted to project a spot of light upon the projection screen at the proper place relative to the moving target to afford to the eye of the bombardier the desired illusory effect. The triangle unit has associated therewith means for tilting the tube per se in a fore and aft direction to give a simulation of trail, which is the relative distance in a fore and aft direction which an actual bomb assumes behind an aircraft in its normal path of movement, such trail existing by virtue of air resistance. This feature of trail, from the bombardier's point of view, exists as a constantly increasing angle presented between his line of sight through the bomb with respect to the vertical. For reasons that will be made clear presently, this factor of trail, considered as a trail angle, is assumed to be constant.

Such fore and aft control by the triangle unit may also be applied to give a simulation of the trigonometrical or cosine component of fore and aft displacement between the bomb and aircraft due to any deviation of the latter from the normal straight line path of flight existing at the time the bomb was released. Additional means are provided whereby the projection flare tube per se may be tilted laterally to simulate lateral displacement of the bomb relative to the aircraft and to the target, such lateral displacement occurring either by virtue of a lateral control being applied to the bomb or by virtue of the lateral trigonometrical or sine component of motion which is applied to the aircraft when the latter deviates from its normal straight line path of movement. Further additional means are provided for bodily rotating the flare tube per se regardless of its position of inclination to simulate the effect of turning of the aircraft after the bomb has been released and its consequent deviation from its normal straight line path of flight.

The other group of instrumentalities or unit comprises a computer mechanism, by means of which the triangle unit just described is, in part, controlled and which includes means for integrating the lateral displacement of the bomb when control is applied thereto in either direction and also includes means for integrating the position of the aircraft in straight line flight at a predetermined constant airspeed or for integrating its position when making turns up to a predetermined arbitrarily chosen limit of 40° from its initial straight line heading. According to the present invention, the present apparatus is designed to compute the relative position of the aircraft and the bomb at all times when either or both of them are being maneuvered within predetermined controllable limits during the time of fall of the bomb. The present apparatus is not concerned with the effect of wind velocity, inasmuch as this has been taken into account as a problem of drift and has been introduced into the training apparatus of the above mentioned copending parent application and is automatically solved by the bombsight mechanism associated therewith.

As previously stated, the matter of apparent trail, according to the present invention, is assumed to be a constant angle and the computer mechanism and triangle unit has been so designed. This has been made possible and greatly simplifies the construction of the present mechanism by virtue of the fact that the apparent trail angle formed by a vertical line extending downwardly from the aircraft and a straight line passing through both the bomb and the aircraft changes but very slightly at any time during the fall of the bomb. Thus, the present computer mechanism is spared the necessity of computing the apparent trail and this factor may be indicated as an initial angular offset or inclination of the flare tube itself.

To sum up the above, the primary function of the present apparatus is to indicate to the bombardier the apparent fore and aft and lateral displacement of the bomb from the aircraft at all times during the fall of the bomb, whether the control is or is not being applied to either the bomb, the aircraft, or both.

It is to be borne in mind that turning of the aircraft will tend to reduce the initial trail angle and during continued maneuvering of the aircraft or of the bomb, or of both, the bomb may actually advance to a point ahead of the aircraft and at either side thereof, depending upon the results of whatever controls may have been applied to the bomb or to the aircraft. If trail be employed, as in the training apparatus of the above mentioned co-pending application, the computing apparatus will function in such a manner as to simulate the forward motion of the aircraft when no control is applied to either the aircraft or the bomb. Under such a condition, the flare tube projector will remain stationary and will be focused at a fixed point on the screen. The image on the screen will traverse this point during the time of fall of the bomb in such a manner that at the expiration of the time of fall of the bomb the point will coincide with the projected image point of aim for the bombsight.

For convenience, the present training apparatus has been designed to simulate the control of a bomb from an aircraft flying at a constant altitude of 15,000 feet and at a constant airspeed of 250 miles per hour, although it is obvious that the apparatus may, by suitable modification, be designed to accommodate a higher or a lower altitude or a greater or lesser airspeed.

The objects and advantages of the present invention are many and varied. They will be better appreciated when a more complete understanding of the invention has been attained. For the present, it is deemed sufficient to state that the principal object of the invention is, in general, to provide an apparatus of the character briefly outlined above and which will afford to a student bombardier maximum proficiency in the art of utilizing azon-controlled bombs. These other objects and advantages of the invention will be pointed out in the following description and claims.

In the accompanying ten sheets of drawings forming a part of this specification, a preferred embodiment of the invention has been shown. In these drawings:

Fig. 1 is a diagrammatic view in graph form showing a series of profile views of an azon-controlled bomb released from an aircraft moving at a predetermined speed in a straight line at a predetermined altitude, various positions of the bomb being shown at predetermined intervals of time after release thereof and the position of the aircraft being shown at corresponding points in its straight line path of travel.

Figs. 4, 4a, 4b, 4c, 4d, 4e and 4f are diagrammatic views similar to Fig. 3. These views when considered collectively, illustrate specific bombing problems which arise when an aircraft is maneuvered from its initial heading during the time of fall of a bomb, both in actual practice and in the training apparatus comprising the present invention.

Fig. 6 is a perspective view, somewhat schematic in its representation, showing a flare tube assembly or aspect angle unit and a triangle unit assembly, and also illustrating the manner in which these two assemblies are operatively connected to each other.

Fig. 7 is a fragmentary, perspective view, schematic in its representation, of a portion of an integrating computer mechanism employed in connection with the present invention.

Fig. 8 is a perspective view, similar to Fig. 7, showing an additional portion of the computer mechanism.

Fig. 9 is a perspective view, similar to Figs. 7 and 8, showing the remaining portion of the computer mechanism.

Fig. 10 is a perspective view showing details of a reverse clutch employed in connection with the present invention.

Fig. 11 is a perspective view, schematic in its representation, showing a slightly modified form of an integrator drive roll assembly which may, if desired be employed in connection with the structure shown in Fig. 8.

Fig. 12 is a schematic view of the entire computer unit shown in Figs. 7 to 11 inclusive. This view represents a simplification of the schematic representation of the computer unit shown in Figs. 7, 8 and 9 and is intended to facilitate an understanding of the basic drive systems associated with the computer unit.

In all of the above described views like characters of reference are employed to designate like parts throughout.

Figure 13:
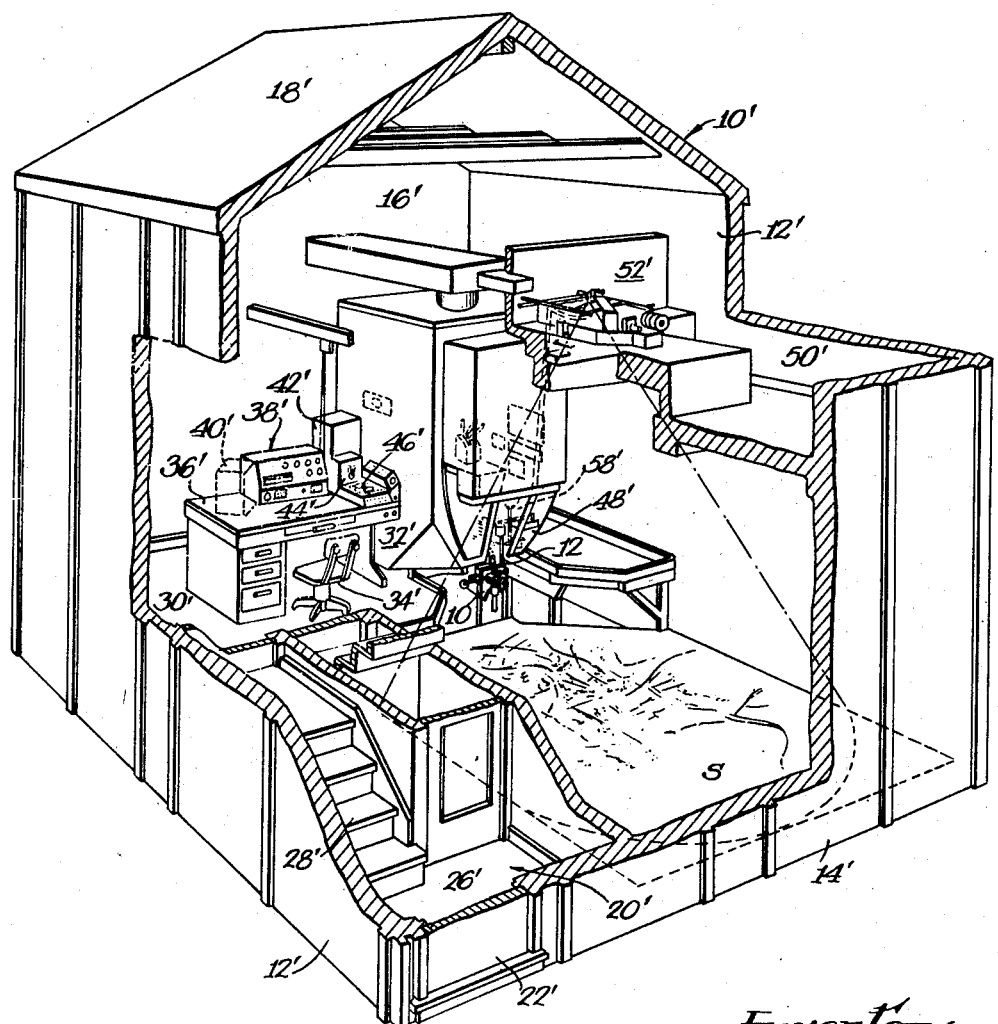
Fig. 13 is a perspective view of a trainer installation showing the present auxiliary training apparatus applied thereto.

Referring now to the drawings in detail, and particularly to Fig. 13, the training apparatus shown and described in the above mentioned co-pending application of George F. Daly is diagrammatically illustrated. The training mechanism illustrated herein differs from the training mechanism of the copending application in that there has been substituted for a so-called "hit projector" employed in connection with the said application a flare tube assembly which is designated in its entirety in the drawing at 12. The trainer mechanism involves in its general organization a two-story structure or building 10' in which the operative instrumentalities of the trainer are installed. Briefly, this structure and the instrumentalities housed therein includes side walls 12', front and rear walls 14' and 16' respectively, a roof 18' and a floor portion 20'. The structure is provided with a door or entrance 22' leading to a passage 26' and a stairway 28', which in turn leads to a platform 30' on which there is installed an instructor's station designated in its entirety at 32' and including an instructor's chair 34' and desk 36' (see also Fig. 3) on which there is mounted a series of control devices including an instrument panel assembly and associated instrumentalities, the panel being designated in its entirety at 38'. Other control devices located at the instructor's station include a bomb release panel 40', a relay cabinet 42', a bomb fall timer 44', a set-up panel 46' and other devices not entirely a part of the present invention but which are included herein for illustrative purposes.

At the right of the instructor's station 32' there is disposed a bombardier's station or compartment 48', commonly referred to as a bombardier's "mock-up," and in which the bombardier is subjected to conditions similar to those encountered in actual flight. According to the principles of the present trainer, he will hear engine noises, experience the freezing cold, and become acquainted with the operation of his bombing equipment under the hindrance of heavy clothing and gloves. The light under which he works and the equipment used by him are identical with those which he will use in actual flight. In making a straight-forward flight, the earth will appear to move toward the bombardier at a uniform velocity.

Operatively mounted on an elevated platform 50' near the top of the structure or building 10' is a projector unit 52' which is so designed as to project a moving image on a screen S provided on the floor 20' and this image is visible to the bombardier within the compartment 48' and also to the instructor at the station 32'. The instructor may watch the image (which ordinarily is a representation of a bombing location on the earth) passing under the bombardier's station 48'.

The auxiliary mechanism comprising the present invention which is in the form of the flare tube assembly 12, together with certain actuating mechanism therefor, is in the form of a "triangle unit" shown in Fig. 6 and of a computing mechanism shown in Figs. 7 to 11 inclusive, and schematically shown in its entirety in Fig. 12. The flare tube assembly 12 is situated below the bombardier's compartment 48', is bolted or otherwise secured to a stationary portion of the training apparatus and is designed to project and superimpose a moving spot of light on the image projected on the screen S and move this spot during the simulated fall of the bomb to represent the appearance of the flare issuing from the tail of the bomb during its trajectory. The flare tube projector or assembly 12 is mechanically coupled to the bombsight 58' in such a manner that the effective turning of the aircraft will impart a component of movement to the assembly 12 in a manner that will be made clear presently. The computing mechanism of Figs. 7 to 11 inclusive is also mechanically coupled to the bombsight in a manner and for purposes that will also be made clear presently.

In order that a complete understanding of the invention may be more readily obtained and in order to adopt a uniform terminology and to make clear such terminology as far as definitions are concerned, Figs. 1 to 5 inclusive have been included herein as a basis for preliminary discussion.

Before entering into a discussion of the various graphs and diagrams shown in Figs. 1 to 5 inclusive, it is necessary that certain structural elements of the present training apparatus as associated with the parent training apparatus of the above mentioned application of George F. Daly be introduced, inasmuch as they are involved in the discussion of these graphs and diagrams that will follow. Some of these structural elements are present in the training apparatus of the above mentioned co-pending application and some of them are present in the instant training apparatus, which is an attachment for the former training apparatus. These elements appear in Fig. 6 in schematic form and also appear in an entirely diagrammatic form in Fig. 3. Reference may be had, therefore, to Figs. 3 and 6 for a preliminary description of the nature of the present apparatus and, subsequently, Fig. 3 will again be referred to for the purpose of expressing certain theoretical principles that are involved in the operation and use of the present training apparatus.

Figure 3:
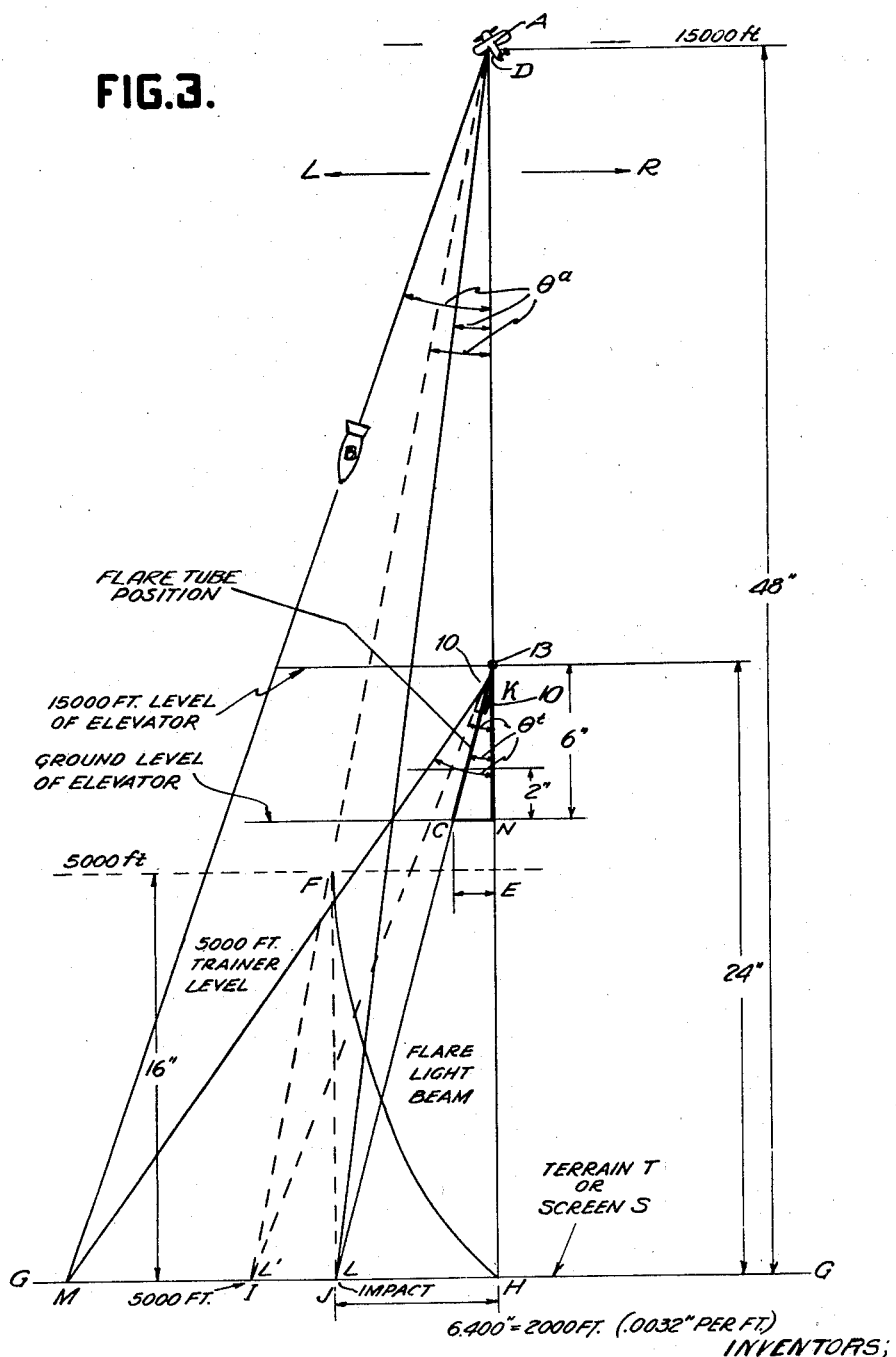
Fig. 3 is a diagrammatic view showing the geometric relationships existing in the training apparatus between the bombsight and flare projector.

The flare tube projector unit, previously referred to in the preliminary part of this specification, is shown schematically in Figs. 3 and 6 and is designated in its entirety at 10. This tube 10 forms the principal element of a flare tube assembly 12, which is mounted beneath the bombardier's compartment 48' at approximately the position of the hit projector employed in connection with the original training apparatus of the above mentioned co-pending application. The tube 10 is capable of universal swinging movement about the axis of its pivotal point of support and, to this end, it is mounted in a gimbal structure 13 and control means, designated in their entirety at 14 in Fig. 6 and the nature of which will be described in detail subsequently, are employed for imparting components of lateral swinging movement and of fore and aft swinging movement to this flare tube projector unit to accomplish illusory effects, as previously set forth. The illusory effects just mentioned are, in the case of fore and aft swinging movement, to give a simulation of the trigonometrical or cosine components of fore and aft displacement between the bomb and aircraft with a constant condition of trail being preset into the unit, as will be described presently. In the case of lateral swinging movement, the effect will be to give a simulation of the lateral or sine component of motion which is applied to the aircraft when the latter deviates from its normal straight line path of movement. Means are also included in the mechanism 14 for rotating the gimbal structure 13 bodily without disturbing the setting or inclination of the unit 10 relative to the vertical to simulate the effect of voluntary turning of the aircraft after the bomb has been released. The fore and aft and lateral components of motion applied to the flare tube unit 10 are derived from a computer mechanism designated in its entirety at 16 and being shown principally in three sections in Figs. 7, 8 and 9. The general function of this computer mechanism, which includes means for integrating the lateral displacement of the bomb when control is applied in either direction, has been briefly outlined previously and a detailed description thereof will follow. The means for rotating the gimbal structure 13 of the flare tube assembly 12 derives its motion from the ring gear of the bombsight stabilizer, as illustrated in the above mentioned co-pending application.

The flare tube unit 10 contains a suitable source of illumination, not shown, and the tube is so constructed that it will direct a spot of light downwardly onto the screen, a portion of which is designated at S in Figs. 3, 6 and 13, upon which the moving image of the terrain is adapted to be projected substantially as shown in the above mentioned co-pending application.

Fig. 3 will be discussed in two places in this specification, the first discussion, which follows immediately, being for the purpose of illustrating certain theoretical principles involved in connection with the dropping of an azon bomb on a target area in actual practice and simulating in the trainer the effect of such dropping of the bomb on a target area of the screen S. In a subsequent discussion of Fig. 3, which will follow after the structural nature of the invention is better understood, certain structural problems involved in the construction of the present training apparatus will be brought up and their solution made clear. Such reference characters and legending as do not appear pertinent to the first discussion will be available for use during the later discussion of this figure.

Fig. 3 has a dual purpose. First, it may be employed to illustrate certain principles that exist in connection with an actual aircraft and a bomb released therefrom. Also, it may be employed to show the geometric relationships in the present training apparatus between the bombsight of the parent training apparatus, shown in the above mentioned co-pending application, the flare tube projector and the effect of certain aspect angle control devices which are incorporated in the triangle unit. It should be borne in mind that the function of the triangle unit is to effect a movement of the flare tube projector 10 to distort the view of the azon-controlled bomb from the aircraft in order that the spot of light will be projected on the screen S at the exact point where the bomb would appear at any time against the background of the terrain as viewed from the aircraft.

Referring now to this figure and assuming the same to illustrate an actual bombing problem, the aircraft A is assumed to be moving in a direction away from the observer, this diagram being viewed from the rear of the aircraft so that any lateral displacement from the aircraft to the right or to the left may be indicated in directions shown by the arrows R and L. Thus no problem of fore and aft displacement of the bomb has been introduced into the conditions portrayed. The aircraft is shown as being located at the assumed 15,000 foot level and lower 10,000 foot and 5,000 foot levels have been indicated accordingly. Under these assumptions, the terrain T is indicated by the line GG. The bomb B in this problem, when it reaches the 5,000 foot level, is displaced laterally from the aircraft by a distance EF which constitutes an actual displacement from the vertical line DH passing through the aircraft A. As observed from the aircraft A, there is an apparent displacement HI (subtended on the terrain). This apparent displacement HI is being constantly decreased during the fall of the bomb and, obviously, at the instant of impact the actual displacement and the apparent displacement of the bomb will be indicated by the distance HJ on the terrain T.

The apparent displacement of the bomb from the aircraft at any time during the fall of the bomb may be defined as an angle $\theta^a$, as well as by the distance or displacement HI. This angle is relatively large immediately after the bomb leaves the aircraft if control is immediately applied, and constantly decreases as the bomb falls toward the terrain after displacement has been effected and control is no longer applied to the aircraft or bomb. For example, at the 5,000 foot level the angle $\theta^a$ is the angle IDH. At the time of impact, this angle $\theta^a$ has decreased and is the angle JDH. This angle $\theta^a$, in the case of actual bombing conditions, will hereinafter, throughout the specification, be referred to as the aspect angle.

In duplicating the above mentioned problem in the present training apparatus the same diagram of Fig. 3 may be employed. It will be understood that the aircraft A in this instance is stationary and that the terrain GG represented by the image on the screen S is moving. Certain dimensions expressed in inches have been introduced into this diagram for illustrative purposes. These dimensions are purely arbitrary and may be varied, if desired, but they serve to illustrate the principles involved in duplicating the above described conditions in the present training apparatus. These dimensions show that the 15,000 foot level of the aircraft is represented by a distance of 48 inches, which is the actual vertical distance existing between the optical center D of the bombsight and the plane of the screen S. The pivot center for the swinging flare tube unit 10 is indicated at K, this center being, for all practical purposes, disposed immediately beneath the optical center D and half-way between this center and the plane of the screen S. In other words, this pivot center is located 24 inches above the plane of the screen. In order to simulate the apparent displacement of a bomb in the position shown in the diagram at the 5,000 foot level, as viewed from the aircraft A, the flare tube unit 10 would have to assume an inclination from the vertical equal to the angle $\theta^t$ which has a magnitude IKH and which, like the aspect angle $\theta^a$, constantly decreases during the fall of the bomb.

The angle $\theta^t$, in the case of the training apparatus as distinguished from the case of an actual aircraft and bomb, is also referred to throughout this specification as the aspect angle, and it is thought that no confusion will arise by designation of both these angles as the aspect angle since it will be remembered that when discussing an actual condition the aspect angle is the angle between the vertical line passing through the aircraft and the line passing through the aircraft and bomb, and that when discussing the mechanism of the trainer the aspect angle will refer to the angle of inclination of the flare tube 10 from the vertical. At the risk of repetition, it is pointed out that the former aspect angle is designated $\theta^a$ and the latter aspect angle is designated $\theta^t$.

In the position of the flare tube 10 when the bomb reaches the 5,000 foot level, a spot of light will be thrown upon the screen at the point I which, in the previously assumed conditions of an actual aircraft and bomb, was a projection on the terrain GG of the straight line passing through the aircraft A and bomb B at the 5,000 foot level. It is obvious that to effect a simulation of further falling movement of the bomb B, the extent of the aspect angle $\theta^t$ will be gradually reduced until such a time as the bomb makes impact at the point J. At such a time, the aspect angle $\theta^t$ will have been reduced in magnitude and will assume the proportions JKH.

It is to be noted at this point that at relatively high altitudes, or, in other words, shortly after the bomb has been released, the apparent displacement is relatively great. For instance, where the bomb B is shown at the 15,000 foot level, the apparent displacement is shown by the distance HM and the angle $\theta^t$ will assume a magnitude of MKH. In an actual case the angle $\theta^a$ will assume the proportions MDH.

As previously stated, the term aspect angle throughout this specification has, in the case of an actual bomb released from an aircraft, been applied to the angle $\theta^a$ existing between a vertical line and a line passing through the aircraft and bomb during the time of fall of the bomb. This angle will be constantly reduced during fall of the bomb after displacement has been effected and control is no longer applied to either the aircraft or the bomb. The term aspect angle has also been applied in the trainer mechanism to the angle $\theta^t$ existing between a vertical line and the longitudinal axis of the flare tube projector, or, in other words, the flare light beam. Since the pivot point for the flare tube projector is located half-way between the plane of the screen and the plane of the optical center D of the bombsight, the magnitudes of the two aspect angles for any particular bombing problem will be different and the aspect angle in the case of the training apparatus will be greater than the equivalent aspect angle in the case of an actual problem. Since $\theta^a$ represents the aspect angle in the case of an actual bomb and $\theta^t$ represents the aspect angle of the flare projector in the trainer, if (HI) represents the apparent displacement of the bomb on the terrain, then the relationship existing between $\theta^a$ and $\theta^t$ may be expressed as follows: tan $\theta^t$=2 tan $\theta^a$. In other words, the tangent of $\theta^t$ will be twice tangent of $\theta^a$. Obviously, where the dimensions existing in the trainer are different from those expressed here, a different, but nevertheless constant, geometrical relationship may be expressed between the magnitude of the two aspect angles in the case of an actual problem and in the trainer respectively.

Figure 1:
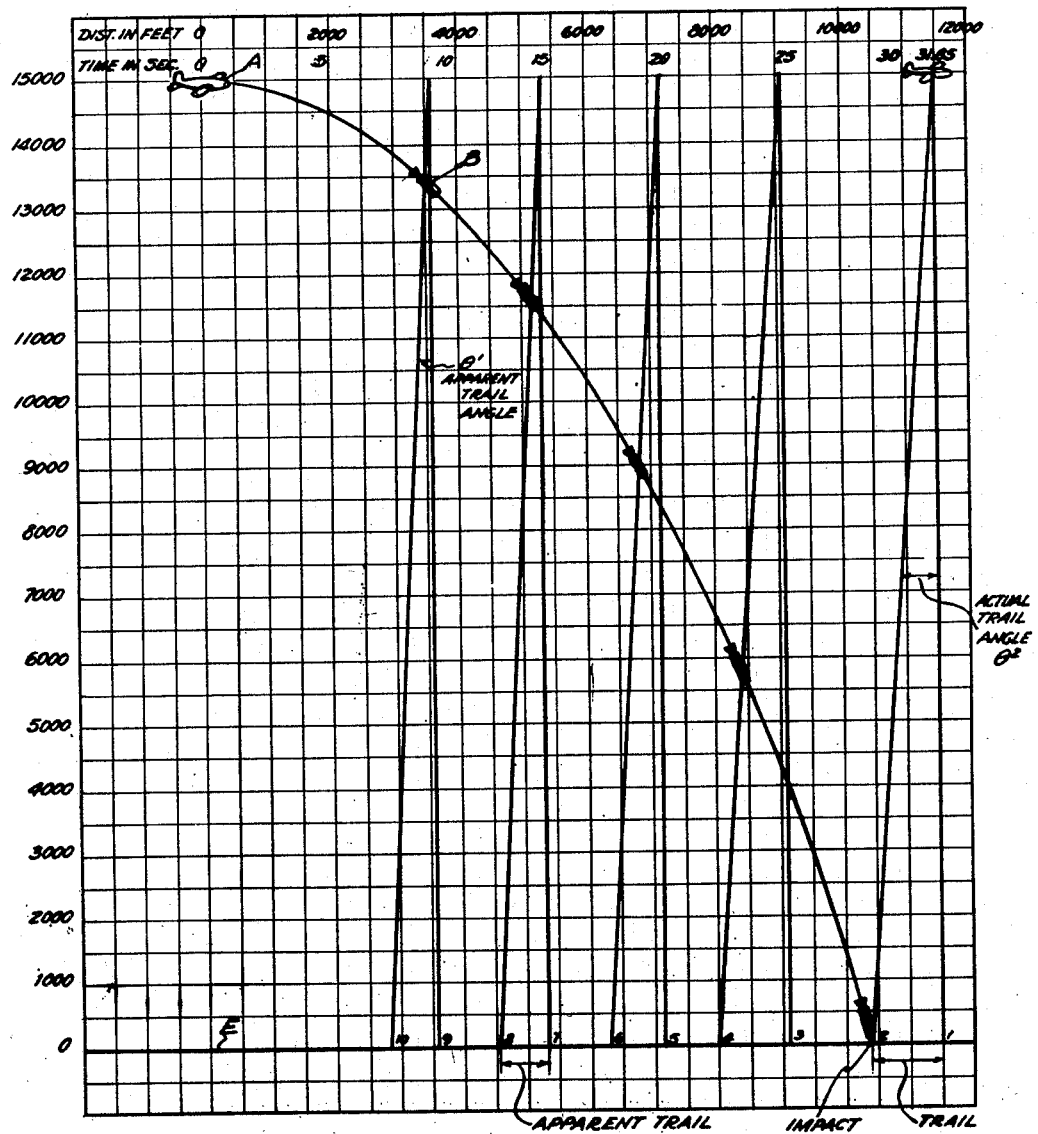

Fig. 1 constitutes a graph illustrating the profile views for an azon-controlled bomb B released from an aircraft flying at a constant predetermined speed and at a constant predetermined altitude. Thus this graph is concerned only with fore and aft displacement of the bomb and lateral displacement is not considered. For convenience of illustration, the speed assumed is 250 miles per hour and the altitude assumed is 15,000 feet, the present trainer having been designed to accommodate these two magnitudes. The aircraft is designated at A and is shown at the position of release of the bomb and at 10, 15, 20, 25 and 30 second intervals after release of the bomb. The position of the aircraft is shown as being maintained at the 15,000 foot level. The position of the bomb is likewise shown at 10, 15, 20, 25 and 30 second intervals after its release. Lines projected from the aircraft through the bomb at each interval form with a vertical line passing through the aircraft angle $\theta^1$, known as the apparent trail angle. The line which this angle subtends on the surface of the terrain T is known as the apparent trail. It will be noted that there is a slightly increased apparent trail angle, and consequently apparent trail, which is especially noticeable during the period from approximately 10 seconds after release until impact between the bomb and the earth. For the purpose of the present invention, trail may be defined as the distance behind a point on the terrain immediately below the aircraft at which the bomb strikes the terrain. The actual trail angle is shown at $\theta^2$ and is the angle existing between the vertical and a line passing through the aircraft and point of impact. Actual range, for the purpose of the present invention, may be defined as the distance existing from a point immediately below the aircraft at the time of bomb release to the point of impact of the bomb.

In the present training mechanism, the continuous increase in the apparent trail angle $\theta^1$ is relatively unimportant. Since an azon bomb is not controllable for deviation of its trajectory in a fore and aft direction, it is impossible to control the actual range after release of the bomb. The variation in the apparent trail angle $\theta^1$ is slight, as may be ascertained from an inspection of Fig. 1 and, therefore, the present training apparatus is constructed to use a constant apparent trail angle. This angle is a predetermined constant and is always a function added to or incorporated in the aspect angle $\theta^t$. The trail at the moment of impact, which at the assumed airspeed of 250 miles per hour and elevation of 15,000 feet, would, in actual practice, be 1,125 feet and is represented in the training mechanism by an initial displacement of the flare tube projector from the vertical at an angle which will project a spot of light a distance corresponding to 1,125 feet in an aft direction from a point on the screen immediately below the aircraft at all times during the fall of the bomb.

The function of the graph shown in Fig. 1, for the purpose of illustrating the present invention, has been to establish certain definitive terms, as well as to illustrate the fact that trail in the present training apparatus may, with impunity, be considered as a constant angular factor compensated for by an angular offset in the initial setting of the flare tube projector. In this graph, the various terms just discussed have been adequately labeled on the drawing.

Figure 2:
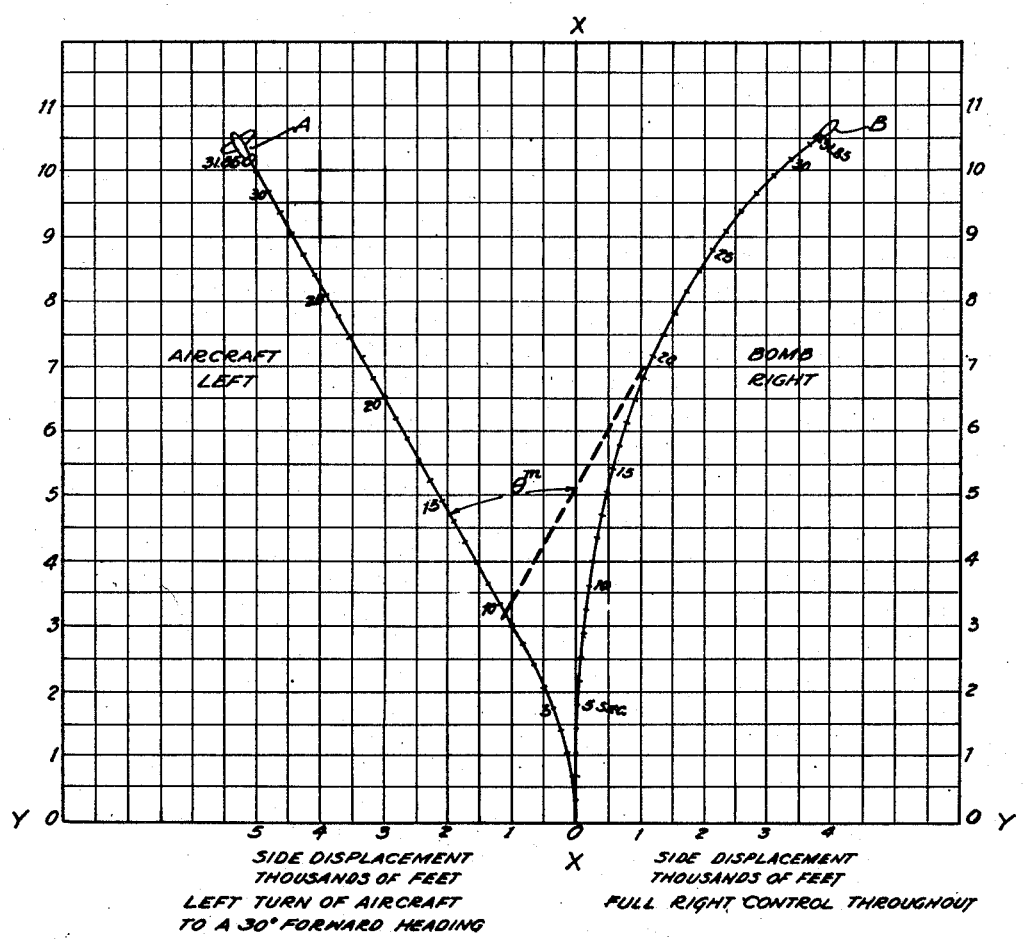
Fig. 2 is a similar diagrammatic view in graph form illustrating the maximum lateral displacement of the aircraft and bomb if the latter be continuously controlled in one lateral direction and the former executes a 30° turn in the opposite direction at the time the bomb is released.

Fig. 2 is a graphic view intended to illustrate the maximum possible lateral displacement between the aircraft A and the bomb B if the bomb be controlled for lateral deflection toward the right and if the aircraft executes a 30° lefthand turn at the assumed speed of 250 miles per hour. This graphic view indicates a net lateral displacement under these conditions which is beyond the capacity of the flare tube projector. Since the aspect angle of the projector is capable of assuming a maximum angle $\theta^m$ of only approximately 25°, certain limit contacts, to be referred to later, will become opened when this angle is exceeded by the projector. When this maximum angle $\theta^m$ is reached, it will, under the present assumed circumstances, indicate a 21 second fall of the bomb under maximum lateral control in one direction with the aircraft making a turn of 30° in the other direction immediately upon release of the bomb. In such an instance, the bomb will have been deflected 1,200 feet in one direction and the aircraft will have flown 3,250 feet in the other direction from an axis X—X representing its initial heading at the time of bomb release. It may also be ascertained from this graph that if the aircraft were to continue on a straightforward course along the line X—X after release of the bomb and maximum control were applied to the bomb for lateral displacement thereof in either direction, the total lateral displacement would be approximately 3,750 feet and the aspect angle $\theta^m$ would be well within the limits of the capability of deflection of the flare tube unit. The above calculations and the illustration of Fig. 2 is based upon the stated assumed conditions of airspeed and altitude for a particular installation of the training apparatus, and it will be understood that for different assumed conditions and different installations of the trainer, suitable modification may be made accordingly.

Figs. 4, 4a, 4b, 4c, 4d, 4e and 4f comprise a series of geometrical diagrams which may be employed to illustrate the relative displacement between the aircraft and bomb when maneuvering the aircraft. As in the case of Fig. 3, these diagrams are employed to illustrate actual flying conditions and conditions as they exist in the trainer. It should be borne in mind during the following discussion of these figures that the computer mechanism 16 of Figs. 7, 8 and 9 is so designed that one group of mechanism, subsequently to be described, is employed to integrate relative displacement between the aircraft and bomb when control is applied to the aircraft and that a separate mechanism is employed to compute the displacement when control is applied to the azon bomb. The resultants of both of these displacements are fed through a differential mechanism to the control means 14 or triangle unit shown in Fig. 6 and this latter unit functions to record the lateral displacement by the positioning of a spot of light on the screen S at a point where the terrain would be eclipsed by the bomb as viewed from the aircraft.

Figs. 4, 4a, 4b, 4c, 4d and 4e show a problem in the trainer simulation that which is presented when the aircraft is maneuvered by turning in either direction during the time of fall of a bomb.

In Fig. 4a the aircraft A at the position P1 is heading along an axis X—X toward the target T1. The range is designated at R. Under these conditions, assuming a zero trail, the target T1 will be directly beneath the aircraft at the expiration of time of fall of the bomb.

In Fig. 4b the aircraft is shown as having assumed a new course X'—X' immediately upon release of the bomb. In this figure, the heavy line indicates the position of the aircraft over the ground; P1 indicates the position of the aircraft at the instant of bomb release; P2 indicates the position of the aircraft at the instant of impact, and T1 represents the target.

Fig. 4c is somewhat similar to Fig. 4b and shows the position and heading of the aircraft immediately after the release of the bomb and when the former has been turned through a 30° angle, θ.

Fig. 4d shows the corresponding position of parts in the training mechanism under the same conditions set forth in Fig. 4c.

In Fig. 4e the aircraft has been turned to the left and this turn has been simulated in the trainer by rotating the target image on the screen S in the direction indicated by the arrow so that the aircraft flies toward the left of the target, as originally shown in Fig. 4c.

Figure 4:
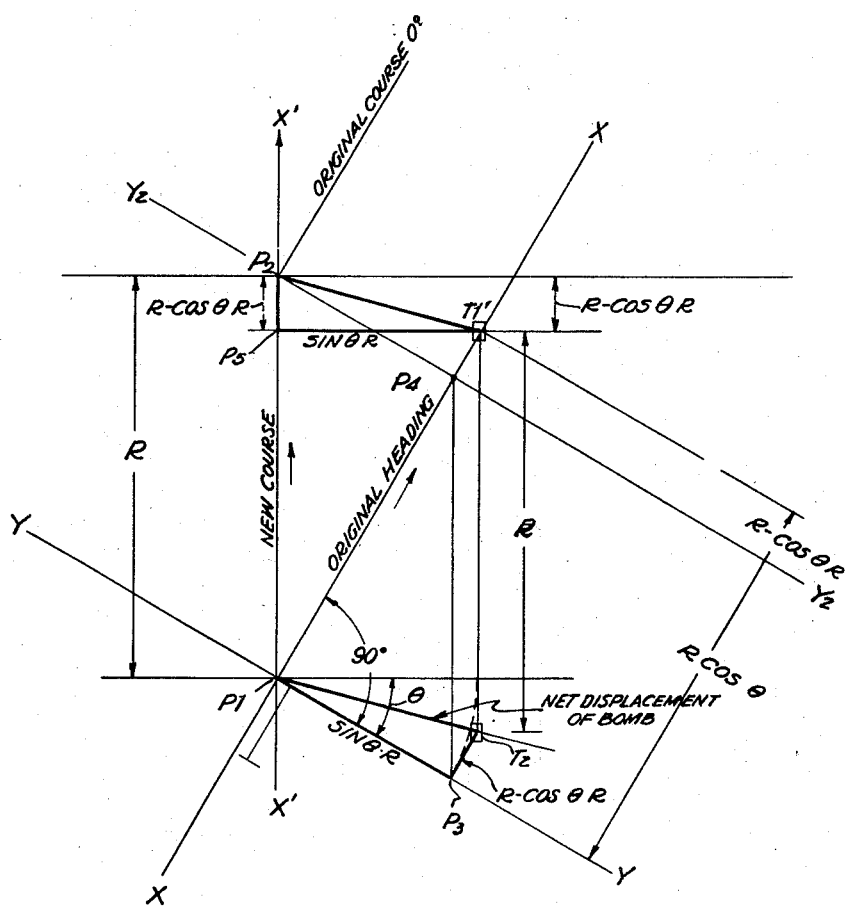

Referring now to Fig. 4, the initial position of an aircraft in actual flight is shown at P1 and its initial or original heading is shown along the axis X—X on which the target is disposed at a position T1. Assuming that the aircraft makes a 30° left turn immediately upon release of the bomb, the new heading thereof is indicated along the line X'—X' in the direction of the arrow and the position of the aircraft at the expiration of the time of fall of the bomb is indicated at P2. To achieve the same effect in the training apparatus, the point P1 remains at rest since the aircraft is motionless. The target advances from the position T1 to the position T2, i. e., the target moves toward the aircraft on a parallel course a distance T1T2 equal to the original range P1P1. This distance is the range R.

The axis Y—Y is at right angles to the initial heading of the aircraft and the target will appear ahead of this line by a distance which may be expressed as $R - \cos \theta R$. The lateral displacement of the target along the Y—Y axis may be expressed as $\sin \theta R$. At the expiration of the time of fall before the aircraft is brought back on its original heading along the line P2P5, the relative position of the target with respect to the position P2 may be ascertained by reference to Fig. 4e.

Fig. 4f illustrates the relative position P2 of the aircraft and the position T2 of the target after the aircraft has been turned back to the original heading, as evidenced by rotation of the target image in the direction indicated by the arrow in this figure. In this case, the target will appear ahead of the axis Y—Y.

Figs. 4e and 4f illustrate the steps of releasing of the bomb, changing of the heading at the time of release, procedure on a new heading during the time of fall of the bomb, and changing back to the original or any other heading.

Figs. 4 and 4a to 4f inclusive are employed herein to indicate that rotation of the flare tube projector assembly affords a simple solution to the problem of turn control, since it is possible to sweep the spot of light representing the azon bomb flare around the vertical axis of the aircraft by rotating the gimbal structure 13, thus dispensing with complicated integrating mechanism. This is made possible since the distance P1T2 remains constant. The problems involved herein may be predicated upon the proposition that the aircraft remains at rest in space and turns about its vertical axis.

The previous discussion of Fig. 4 and its related figures will assist in an understanding of the function of certain sine and cosine computer discs, the nature of which will be made clear presently, and which are associated with the computer mechanism 16 of Figs. 7, 8 and 9, which mechanism determines the relative position of the aircraft and the bomb regardless of whether one or the other, or both, of these movable bodies undergo lateral displacement. It has been assumed in connection with Fig. 4 that the trail of the bomb is non-existent, and thus if the bomb and aircraft were to continue on their original heading the point of impact would be directly beneath the aircraft. As previously explained, the point of impact in actual practice will be on the X—X axis behind the aircraft, as indicated in Fig. 1. Fig. 4 is intended to illustrate the relative position of the aircraft and bomb at the time of impact of the bomb either (1) when the aircraft is flying over the terrain, or (2) as conditions are simulated in the trainer.

In the case of actual flight, the following positions are identified:

P1. Position of aircraft at instant of release.
P2. Position of aircraft at instant of impact.
T1. Position of the target at impact.

In the case of the trainer, where the terrain is represented as a projected image moving below the aircraft, the following positions are shown:

P1. The turn center of the bombsight.
T1. Position of the target at the time of release.
T2. Position of the target at impact.

The line P1P2 represents the distance traveled by the aircraft during time of fall of the bomb, and the line T1T2 represents the same distance of motion of the target in the trainer assuming zero trail.

The distance P1T1 is the range and is of a magnitude R. This distance is laid out along the line P1P2. A perpendicular erected on the line P1T1 to intersect the position P2 will intersect the line P1T1 at a point P4. Since P1P2 is the hypotenuse of the right triangle P1P2P4, the distance P1P4 is the cosine of the angle θ times the range R and the line P2P4 is the sine of the angle θ times the range R. The line P5T1 is perpendicular to the line P1P2 and intersects the position of the target T1. Since P1T1 equals P1P2, the triangles P1P2P4 and P1P5T1 are similar and congruent but are reversed in their positions. Consequently, the triangles P2P5T1 and T1P4P2 are similar and congruent. Therefore, the distance P2P5 equals the distance T1P4 and both of these distances are represented by $R-\cos\theta R$.

If a line be drawn from P4 to P3 on the original Y—Y axis and if this line be parallel to the line P2P1, the distance P1P3 will be equal to the distance P2P4. Since this line represents the lateral displacement of the aircraft from the bomb in all of the examples shown, and since the triangle P2P4T1 is similar to the triangle P1P3T2, it therefore follows that the position T2 represents the actual relative position of the target to the position of the bombsight turn center P1 in the trainer at the instant of impact.

Certain relationships existing in Fig. 3 pertain to the relative positioning of certain movable parts of the triangle unit or control means 14 of Fig. 6. These relationships will be brought out hereinafter, but first it is necessary that the nature of the triangle unit be understood. Referring now to Fig. 6 in detail, the flare tube assembly 12, which is diagrammatically shown, includes the flare tube projector unit 10 and its gimbal structure 13. The tube casing is designated at 18 and is supported between a pair of side pieces 20, the upper ends of which are pivotally connected as at 22 to a block 24 forming a part of the gimbal structure 13. The block 24 is provided with trunnions 26 which are rotatably supported by downwardly extending arms 28 provided in a U-shaped bracket 30. Thus it will be seen that the tube casing 18 is capable of universal swinging movement, the fore and aft component of which is controlled by tilting of the block 24 on the axis of the trunnions 26 and the lateral or azon component of which is controlled by swinging movement of the side pieces 20 relative to the block 24.

Rotation of the gimbal structure 13 about a vertical axis is accomplished by means of a train of gears which are designated in their entirety at 32, one of these gears being operatively connected to a hollow tubular member 34 on which the gimbal structure 13 is mounted and with which it is adapted to rotate. The train of gears 32 are adapted to be connected by a series of shafts 36 and bevel gears 38 which derive their motion from the ring gear of the bombsight stabilizer in the parent training apparatus.

In order to impart right and left azon components of motion to the tube casing 18 along the Y—Y axis of swinging movement thereof, a cable 40 passes over a fixed pulley 42 and downwardly through the hollow tubular member 34, beneath a pulley 44 mounted in the gimbal structure 13, over a pulley 46 suitably supported from the gimbal structure 13 through the hollow trunnions 26, around a pulley 48 carried in a bifurcated member 50 mounted at the outer end of one of the trunnions 26 and is secured to a quadrant member 52 carried by one of the side pieces 20 of the flare tube casing 18. Suitable spring means 54 are provided for normally urging the flare tube projector 10 toward its extreme right-hand position. The position of the projector, however, at any moment is determined by the paying in or feeding out of the cable 40.

In order to impart fore and aft components of swinging movement to the projector 10, a cable 56 leads from the triangle unit 14 and passes over a pulley 58 and downwardly through the hollow tubular member 34, beneath a pulley 60, over a pulley 62 and is secured to a second quadrant 64 mounted on one of the trunnions 26. A coil spring 66 serves to normally urge the block 24 in such a direction that the projector 10 will be swung in a forward direction by actual control of the fore and aft component of swinging movement of the projector under the control of the cable 56 leading from the triangle unit 14.

The triangle unit 14 per se, which controls the fore and aft and right and left lateral azon components of swinging movement of the projector 10, involves in its general organization a pair of rods 68 and 70, the tilting movements of the former serving to control the right and left lateral or azon tilting movements of the projector tube 10, and the tilting movements of the latter serving to control the fore and aft tilting movements of the projector 10. Toward this end, the two rods 68 and 70 are mounted for independent tilting movement about a horizontal axis H—H. The upper end of the rod 68 carries a segment 72 to which an end of the cable 40 is adjustably anchored. From the upper curved surface of the segment 72 the cable 40 passes beneath a pulley 74 and over a fixed idler pulley 76, from whence it passes to the projector tube assembly 12. Similarly, the upper end of the rod 70 carries a segment 78 to which an end of the cable 56 is adjustably anchored. From the upper curved surface of the segment 78 the cable 56 passes beneath a pulley 80 and over a pulley 82, from whence it passes to the projector tube assembly 12.

The rod 68 carries near its upper end, and above the pivotal axis H—H, a contact operating finger 84 designed for cooperation with a pair of limit contact assemblies 85, 85, the function of which will be set forth presently. Similarly, the upper end of the rod 70 carries a contact operating finger 86 designed for cooperation with a pair of limit contact assemblies 87, 87, the nature of which will also be made clear subsequently.

In connection with Fig. 6, it is to be noted that while the rods 68 and 70 occupy side-by-side positions and are adapted to be tilted in either direction in adjacent parallel planes, tilting movement of the former rod in one plane will operate to impart lateral azon swinging movements to the projector tube 10, while tilting movement of the latter rod in a parallel plane will serve to impart fore and aft tilting movements to the projector. By noting the direction of the various labeled arrows in this figure, it will be seen that tilting movement of the rod 68 to the left will cause a right azon movement to the projector tube 10, while the reverse tilting movement of the rod 68 will serve to apply a left azon movement to the projector. Similarly, tilting movement of the rod 70 to the left, as shown in this figure, will cause a forward component of swinging movement to be applied to the projector 10, while tilting movement of the rod to the right will cause an aft component of swinging movement to be applied to the projector 10. As will be brought out in detail subsequently, the triangle CKN of Fig. 3 represents the mechanism of the triangle unit in Fig. 6.

The rod 68 will hereinafter be referred to as the Y-rod, inasmuch as it controls the lateral or azon swinging movements of the flare tube projector 10. Similarly, the rod 70 will hereinafter be referred to as the X-rod, inasmuch as it controls the fore and aft swinging movements of the flare tube projector 10.

The lower end of the Y-rod 68 has mounted thereon an operating pin 69 which cooperates with a slot 71 formed in a spring biased, unstable, over-throw plate 73. The plate 73 carries a contact operating finger 75 designed for cooperation with a contact group assembly 77, the function of which will be set forth presently. Similarly, the lower end of the X-rod 70 is provided with a spring biased, unstable, over-throw plate 79, which cooperates with a contact group assembly 81, the function of which will also be described subsequently.

The X- and Y-rods have associated therewith a vertically movable carriage designated in its entirety at 88. This carriage includes a framework 90, a portion of which is diagrammatically shown in the figure under consideration. Projecting downwardly from the framework 90 at the forward end thereof is an elongated vertical rack 92 having teeth 94 formed thereon. This rack meshes with a pinion 96 carried on a horizontal shaft 98. The other end of the shaft 98 has mounted thereon a second pinion 100 which meshes with teeth 102 formed on a second rack 104, which is spring pressed as at 105, hereinafter referred to as the gravity cam rack. The gravity cam rack 104 carries at its rear end a cam roller 106 designed for cam engagement with the surface 109 of a cam 108, hereinafter referred to as the gravity cam. The surface 109 of the gravity cam 108 is provided with a relatively deep trough portion 110 which determines the final position of the roller 106 and of the rack 104 associated therewith. This trough portion 110 operates in the manner of a limit stop to determine the final position of the gravity cam. The gravity cam 108 is cut according to considerations of gravity acceleration according to the formula $h = \frac{1}{2} gt^2$ wherein $h$=heighth at any particular instant and wherein $g$=32.16 feet per second per second and $t$=time in seconds, as modified by considerations of air resistance, bomb size and shape, etc.

It will be seen that when the roller 106 is disposed within the trough portion 110 of the cam surface 109, the carriage 88 will assume its extreme lowermost position. As the roller 106, commencing on the extreme outermost point on the surface 109, rides inwardly on this surface, the rack 104 will be carried therewith, thus rotating the shaft 98 in the direction indicated by the arrow and causing the carriage 88 to be lowered at an accelerated speed. When the roller enters the trough portion 110 and reaches the bottom thereof, the carriage 88 will assume its lowermost position. The framework 90 of the carriage 88 has mounted thereon a pointer 93 designed for cooperation with a vertical scale 95 suitably supported from a stationary part of the framework and which may be calibrated to represent the elevation of the aircraft in the trainer. For convenience, this calibration may be in terms of thousands of feet, the upper index of the scale representing the 15,000 foot level of the aircraft and the lower index point representing zero or ground level. It will be understood that the pointer 93 will arrive at this latter index point at the time of impact of a bomb dropped from the aircraft. The scale 95 may also be calibrated in terms of the time function, as expressed in seconds elapsed from the time of release of the bomb.

The gravity cam 108 is mounted upon a horizontal shaft 112, the outer end of which is designed for pin and slot connection with a coupling sleeve 114, by means of which it is connected to the computer mechanism 16 of Figs. 7, 8 and 9 in a manner that will be set forth presently.

The carriage 88 has associated therewith a pair of lead screws 116 and 118, the former being referred to as the Y-lead screw and the latter being referred to as the X-lead screw. The Y-lead screw passes through and has mounted thereon a lead carriage 120 on which there is mounted a pair of lead rollers 122 designed to straddle the Y-pendulum rod 68 and control the movements of the latter. Similarly, the X-lead screw 118 has mounted thereon a lead carriage 124 on which there is mounted a pair of lead rollers 126 which straddle the X rod 70 and control the movements thereof. Each of the lead carriages 120 and 124 has mounted thereon a pointer 128 designed for cooperation with a suitable scale 130 which is calibrated to represent in feet, or any other suitable linear measurement, the lateral displacement and the fore and aft displacement of the azon-controlled bomb. The Y-lead screw 116 carries at its forward end a bevel gear 132 which meshes with a similar bevel gear 134, which is slidably mounted on a vertically extending spline shaft 136. The lower end of the spline shaft 136 carries a bevel gear 138 which meshes with a second bevel gear 140 mounted on a shaft 142, hereinafter referred to as the Y-drive shaft. The shaft 142 has mounted thereon a disc 144 having a circular periphery 146 provided with a notch 148 therein adapted to receive therein a roller 150 when the rod 68 approaches its vertical position during certain resetting operations which form no part of the present invention and which will be but briefly referred to herein. The shaft 142 also has associated therewith a clutch 143, hereinafter referred to as the Y-clutch. The cam roller 150 is associated with the contact assembly 152, likewise associated with such resetting operations. The X-lead screw 118 carries at its rear end a bevel gear 154, which meshes with a similar bevel gear 156 mounted on a vertical spline shaft 158. The shaft 158 carries at its lower end a bevel gear 160 which meshes with a second bevel gear 162 mounted on a shaft 164, hereinafter referred to as the X-drive shaft. The X-drive shaft 164 has mounted thereon a disc 166 similar to the disc 144 and having a notch 168 in the periphery thereof designed for cooperation with a roller 170 that cooperates with a contact group 172, the nature of which will be set forth subsequently. The X-drive shaft 164 and the Y-drive shaft 142 are designed for pin and slot connections with respective coupling sleeves 174 and 176 similar to the sleeve 114. The series of shafts 36, previously referred to and associated with the projector assembly 12, includes a horizontal shaft 39 designed for pin and slot connection with a coupling sleeve 41 leading to the bombsight stabilizer.

From the above description it will be seen that the triangle unit 14 is provided with three input shafts 112, 164 and 142. This triangle unit is provided with two output devices in the form of the cables 56 and 40, which function to impart fore and aft, and lateral components of tilting motion to the projector tube unit 10. Rotation of the gimbal structure 13 of the projector assembly 12 is independent of the triangle unit 14 and is controlled from the ring gear of the bombsight stabilizer associated with the parent training apparatus.

The gravity disc 108 operates through the medium of the follower 106, rack 102, shaft 98 and driving disc 96 to raise or lower the lead carriage assembly, including the lead carriages 120 and 124 which control the angular positions of the X- and Y-rods 70 and 68 respectively. This has the effect of lessening the degree of angular control over the X- and Y-rods for a given amount of lateral movement of the lead carriages 120 and 124 respectively as the elevation of these carriages is decreased. The movements of the X- and Y-rods 70 and 68 respectively control the movements of the flare tube assembly 12 as previously described. The projection on the ground surface of any given lateral component of movement of a projectile, as viewed from the aircraft when the projection is at a higher elevation, is greater than the projection of the same lateral displacement of the projectile when the latter is at a lower elevation. The gravity disc 108 and the manner in which it progressively lowers the lead screw carriages 120 and 124 at increasing rates of speed serves to duplicate this phenomenon in the movements of the flare tube assembly 12. In other words, movement of the lead carriages 120 and 124 along the longitudinal axes of their respective lead screws 116 and 118 when these carriages are in an elevated position has a greater angular effect on the movement of the flare tube assembly 12 than such axial movements have when the carriages are in a lowered position.

It will be understood that in the schematic representation of the triangle unit 14 of Fig. 6, all of the supporting framework has been removed. For example, the various rotatable shafts must necessarily have associated therewith suitable bearings for supporting the same and the carriage 88 must also be suitably guided in its vertical movements. Such supporting structure has been eliminated for convenience of illustration and it is thought that a full and comprehensive understanding of the nature of the computer unit may be had, regardless of the omissions.

Referring again to Fig. 3, it will be seen that the proportions for this diagram are established when the lead screw carriage is in its lowermost position representing ground level. The vertical line KN of the triangle CKN represents the distance from the aircraft to the terrain at all times while the aircraft is flying at 15,000 feet. The vertical motion of the carriage 88 is six inches at an accelerating rate of .004 inch per second, this arbitrary dimension and rate being selected to accommodate other arbitrarily selected features, dimensions and conditions associated with the trainer. The base CN of the triangle CKN represents the displacement of the control members 122 on 124 or either the X- or Y-lead screw 118 or 116 respectively. The hypotenuse CK represents either rod 68 or 70 which, by means of the steel cables 40 and 56 respectively, control the angular position of the flare tube 10. The example in Fig. 3 indicates that the spot of light at the time of impact of the bomb will be projected on the screen at a point 6.4 inches (i. e. 2,000 feet) from the sight center H if there be a corresponding displacement of the rod along its respective lead screw.

The computer mechanism 16, shown in semi-schematic form yet somewhat in detail in Figs. 7 to 11 inclusive, is provided with three output shafts, each of which is adapted to be coupled to a corresponding input shaft in the triangle unit just described. These output shafts are identified as follows: the X-drive shaft 200, which is adapted by means of the sleeve 174 to be coupled to the X-input drive shaft 164 to control the fore and aft swinging movements of the projector 10; the Y-drive shaft 202, which is variously referred to as the left or right turn azon drive shaft or the lateral displacement shaft, this latter shaft being adapted to be coupled by means of the sleeve 176 of the Y-drive shaft 142 of the triangle unit 14; and the altitude drive shaft 204, which is adapted to be coupled by means of the sleeve 114 to the horizontal cam drive shaft 112 of the triangle unit 14.

It will be helpful toward an understanding of the computer mechanism about to be described to explain that the computer mechanism is designed to provide three types of control for the triangle unit, which controls the aspect angle $\theta^t$ of the projector tube 10 and which, therefore, is sometimes referred to as the aspect angle unit. The three output drives just described from these controls will displace certain parts of the aspect angle unit, which in turn will control the motion of the tube 10 to indicate the apparent relative displacement of an aircraft and bomb on the trainer screen. The mechanism in the computing device 16 may be described generally by dividing the same into three classes according to their respective functions, i. e., (1) aircraft motion, (2) bomb motion, and (3) time control. In Fig. 1 it has been shown how the apparent trail is reasonably constant and may be indicated as a fixed dimension in the training apparatus. This factor of trail may be set into the aspect angle unit by an initial adjustment of the position of the flare tube projector, which may be accomplished by adjusting the point of attachment of the cable 40 to the segment 72 as shown at 73 (Fig. 6). This is very convenient from a constructional point of view because it serves to eliminate further complications which would ordinarily be required if the trail motion were to be fed through an additional integrator similar to the mechanism employed to show the effect of control applied to the aircraft, the bomb, or both.

The effect of control applied to an azon bomb makes it necessary to employ an integrator disc and a roll and to superimpose on this computer a control from another mechanism, which will change the rate of acceleration, depending upon the past history of control that has been applied during the falling of each individual bomb. It is obvious that the lateral acceleration rate of the bomb will be governed by the relative time and duration when control has been applied.

In the schematic representation of the computer unit shown in Figs. 7 to 11 inclusive, the mechanism is generally divided into aircraft controls, azon controls and time control mechanisms, together with the interrelated gearing and other related parts whereby these various instrumentalities are cooperatively connected together. The timer acceleration controls are indicated in Fig. 9. Figs. 7 to 11 inclusive show the mechanism in the computer unit with all the supporting framework removed.

The computer unit 16 provides mechanism for solving the various problems outlined above concurrently and for utilizing the results of the computations made therein in combination to control the aspect angle of the flare tube 10. Generally speaking, the computer integrates true fore and aft, and lateral relationships between the aircraft and the bomb, and the results of these computations are fed into the aspect angle unit which serves to distort these displacements according to the geometrical formula given above for the relation between the angles $\theta^a$ and $\theta^b$ in order that a beam of light may be thrown on the screen of the trainer at the point where the bomb flare would be observed by the bombardier in the aircraft from which the bomb was released.

For convenience, the mechanism in the computer unit may be tabulated as follows:

(1) Aircraft motion:
   (a) Lateral displacement of the aircraft from the line of initial heading (X—X axis).
   (b) Forward motion of the aircraft at a fixed airspeed arbitrarily chosen as being 250 miles per hour.
(2) Azon bomb motion:
   (a) Lateral motion acceleration (time control).
   (b) Modification of lateral acceleration as control is applied.
   (c) Lateral displacement of the azon bomb relative to the X—X axis.
   (d) Trail.
(3) Controls applied to the triangle (aspect angle) unit:
   (a) The differential output of (1) (a) and (2) (c) above to indicate net lateral displacement of bomb from aircraft in either direction along the Y—Y axis.
   (b) The differential output of (1) (b) and (2) (d) above to indicate the position of the bomb fore and aft of the aircraft on the X—X axis at all times during fall.
(4) Time controls:
   (a) The controls (2) (a) and (2) (b) above must be related to the time of fall by providing a means for rotating a pair of acceleration rate cams, hereinafter referred to as the $\alpha$ and $\Delta\alpha$ cams, the function and nature of which will subsequently be described. These cams rotate in unison arbitrarily at 12° per second and are designed to produce lateral acceleration when rotated through slightly more than one complete revolution during an arbitrarily chosen 31.85 second interval of bomb fall.
   (b) The triangle unit as described above is provided with the carriage 88 or "bomb elevator" which is lowered under the control of the gravity cam 108 during the time of fall. The vertical position of this carriage corresponds to the position of the bomb in space at all times from the instant of release until the instant of impact.
   (c) In the parent training mechanism of the above mentioned co-pending application, there is provided a projector disc which, for proper synchronization of structure, must be set at a predetermined arbitrarily chosen speed commensurate with the time of fall.
(5) Aircraft turn controls:
   (a) The gimbal assembly 13 of the tube assembly 12 is arranged to turn through the same angle as the turning of the aircraft but in the opposite direction, since the projected spot of light must turn with the image in the trainer (see Figs. 4 to 4f inclusive).

Under the heading "(1) Aircraft motion" above, it is to be noted that the term initial heading employed in sub-section (a) refers to the heading of the aircraft along the X—X axis at the instant of bomb release. Under the heading "(2) Azon bomb motion," the difference between the functions of sub-sections (a) and (b), which are introduced by the $\alpha$ and $\Delta\alpha$ cams, determines or computes the lateral velocity of the bomb at any time during its fall. Under sub-section (d) of this heading, apparent trail is assumed to be a constant angle as viewed from the aircraft, in order to avoid unnecessary complications in the design of the mechanism which would not be useful in observing the results of lateral control applied to the bomb. Under the heading "(3) Controls applied to the aspect angle unit," sub-section (b), it is to be noted that any change in heading of the aircraft will reduce the forward velocity thereof and will, therefore, reduce the apparent trail until the bomb is actually ahead of the aircraft. This occurs when the difference between the air distance of the aircraft and the air distance forwardly from the point of release exceeds the trail.

Referring now to Fig. 7, a disc 210, hereinafter referred to as the azon integrator disc, is so positioned that the rear side thereof serves to drive a roller 212 which is splined to a shaft 214 and is adapted to be moved longitudinally of the shaft by means of a cage or frame 216. The shaft 214 serves through gearing 218, 220, 222 and 224 (see also Fig. 10) to drive the outer members 225 of a reverse clutch assembly designated in its entirety at 226 and which operates under the control of a yoke armature 229 associated with a pair of magnets LAZ and RAZ, the function of which will be set forth subsequently. The center or controlled member 228 is geared back by means of gears 230, 232, 234 and 236 to an azon velocity lead screw 238. The lead screw 238 controls the position of a drive roller 240 which cooperates with the rear side of the azon integrator disc 210. At the beginning of the computing operations, this latter roller is at a position on the disc 210 which indicates zero lateral velocity of the bomb.

The lead screw 238 is driven at all times when azon or lateral control is applied and this lead screw changes velocity of rotation under control of the acceleration mechanism shown in Fig. 9, as will be described presently. This latter mechanism, as will be shown, is designed for continuous control by means of the $\alpha$ cam and is also designed for additional control under the influence of the $\Delta\alpha$ cam but only during those periods of fall of the bomb when control is being applied.

The roller 240 is splined to a shaft 242 and rotates in a clockwise direction, as viewed, whenever the bomb is moving away from the aircraft under right azon control. Conversely, this shaft is adapted to rotate in a counterclockwise direction under left azon control of the bomb. The shaft 242 has affixed thereto a gear 244 which, through gears 246, 248, 250, 252 and 254, drives a cross shaft 256, hereinafter referred to as the azon integrator shaft. The azon integrator shaft 256 serves to drive through gears 258, 260, 262 and 264, a gear 266 which constitutes one side of a differential assembly designated in its entirety at 268. This differential assembly is referred to as the lateral control differential, inasmuch as it functions to control the lateral displacement, azon, or Y-lead screw 116 of the triangle unit 14 to swing the projector tube 10 laterally relative to the X—X axis.

The function of the differential, generally designated at 268, is to combine the lateral or azon displacement drive just described with the drive which represents the lateral displacement of the aircraft when control is applied to the latter. This aircraft control is introduced by means of a sine roller 270 (Fig. 8) which is driven by the front side of a disc 272, hereinafter referred to as the aircraft integrator disc. It is to be noted that in Fig. 8 the aircraft integrator 272 and roller 270 appear to be separated in space. It should be remembered, however, that the present drawing is simply a convenient schematic drawing intended to convey the general principles involved in the operation of the computer and that actually this roller and disc are in intimate operative contact.

The sine roller 270 is slidably supported on a splined shaft 274 which has a gear 276 (see Fig. 7) secured to one end thereof. This gear 276 serves to drive a gear train including gears 278, 280, 282 and 284. The gear 284 is mounted on a jack shaft 286 together with a gear 288. The gear 288 drives a gear 289 fixed to a bevel gear 290 which constitutes a second input for the differential assembly 268. The gears 266 and 290 mesh with bevel pinions 292 and 294 of the differential assembly 268 and serve to rotate the output shaft 296 of this differential. This shaft 296 has mounted thereon a gear 298 which drives an idler gear 300 that in turn drives a gear 302 fixed to the frame of a reset differential assembly designated in its entirety at 304. A reset motor M3 operates through a worm 306, gear 308, shaft 310 and gears 312 and 314 to drive an input gear 316 leading into the differential assembly 304. During reset operations, the lateral displacement reset motor M3 will drive the train of gears 308, 312 and 314, thus rotating the lateral displacement shaft 202 and bringing the same back to its normal position to reset the azon or Y-lead screw 116 to its initial position wherein the Y-rod 68 is brought to a vertical position. The group of mechanisms shown at the left-hand side of Fig. 8 is employed to compute the net displacement of the bomb from the aircraft along the X—X or fore and aft axis, which is the actual heading of the aircraft at the time of bomb release (see Fig. 4). An aircraft motor M2 serves to drive the previously mentioned aircraft integrator disc 272 at an arbitrarily chosen speed of 80 revolutions per minute. The drive between the motor for the disc extends through worm gearing 322, shaft 323, through gears 324, 326 and 328. The shaft 323 extends to the forward end of the computer mechanism 16 and operates through a system of bevel gears designated in their entirety at 330 to drive a shaft 332, hereinafter referred to as the trail shaft. This latter shaft extends across the unit and serves to drive a series of gears 334, 336 and 338, the latter gear being an input pinion of a differential assembly designated in its entirety at 340 and hereinafter referred to as the X-drive differential. The function of the drive arrangement just described leading from the motor M2 is to drive one side of the X-drive differential at the same velocity and in a reverse direction to the drive through the other side of this differential, in order that the output of the differential may be stationary as long as the aircraft remains on its initial heading. The drive to the X-drive differential 340, which is opposed to the input drive of the pinion 338, leads from a disc 342, hereinafter known as the cosine disc, inasmuch as it computes the fore and aft displacement of the aircraft from its initial course according to the trigonometric component $$R - \cos \theta R$$

as discussed in connection with Fig. 4. This cosine disc 342 derives its motion from a shaft 344, which in turn is driven from the ring gear of the bombsight stabilizer in the parent training apparatus. A suitable clutch 346 is interposed in the shaft 344 for reset purposes, as will be described presently. The shaft 344 will be referred to hereinafter as the stabilizer drive shaft.

The drive from the stabilizer drive shaft 344 exists through self-contained gear units 348 and 350 to a shaft 352 and from thence through a system of spur gears designated in their entirety at 354 to a jack shaft 356 carrying a gear 358 which meshes with the teeth on the periphery of the cosine disc. The stabilizer drive shaft 344 arbitrarily makes one revolution for a 3° turn of the aircraft and in order to preserve the proper gear ratio for the conditions arbitrarily chosen a 120:1 reduction in gearing between the stabilizer drive shaft and the cosine disc 342 is necessary.

A second disc 360, hereinafter known as the sine disc, is adapted to be rotated in unison with the cosine disc 342. To this end, the jack shaft 356 carries a gear 362 which meshes with the teeth on the periphery of the sine disc 360.

The sine and cosine discs 360 and 342 are driven whenever the aircraft makes a turn in one direction or the other from the synthetic stabilizer drive for the bombsight in the parent training apparatus. The clutch 346 is adapted to be thrown in at the instant of bomb release. The sine and cosine discs are provided with offset pins 364, the pin on the cosine disc being concealed in Fig. 8 but being perceivable in Fig. 12. The pin in the sine disc is displaced 90° from the pin in the cosine disc and as these discs rotate motion is imparted to a pair of Scotch yoke members 366 and 368 having slots 370 formed therein and through which the respective pins project. The Scotch yoke member 366 serves to support thereon a cage 372 in which there is disposed a roller 374, hereinafter referred to as the cosine roller. Similarly, the Scotch yoke member 368 has mounted thereon a cage 376 in which the previously mentioned sine roller 270 is mounted. It will be seen that the Scotch yoke members 366 and 368 control the positions of the sine and cosine take-off rollers 270 and 374 respectively.

The cosine drive roller 374 will, by virtue of the angular position of the stabilizer drive shaft 344, be positioned to correspond to the cosine of aircraft heading (see Fig. 4), while the sine roller 270 will similarly be positioned to correspond to the sine of the aircraft heading. Turning movement of the cosine roller 374 during the time of fall computes the forward motion of the aircraft with respect to its initial position at the time of release of the bomb. Similarly, rotation of the sine roller serves to compute the lateral displacement of the aircraft from the line of its horizontal heading at the time of bomb release.

The cosine roller 374 will normally be positioned at the rim of the cosine integrator disc 342 to drive the roller in a counter-clockwise direction, as shown. The cosine roller 374 is splined to a shaft 376 and serves to drive a system of gearing, including gears 380, 382, 384, 386, 388 and 390, the latter gear being mounted on a sleeve 392 carrying a differential pinion 394 which constitutes a second input pinion for the differential assembly 340. It is to be noted that the differential input pinions 338 and 394 are normally driven at the same velocity and in opposite directions as long as the aircraft remains on its initial heading, which is the heading when a bomb is released. The frame of the differential assembly 340 which supports two idler pinions 396 and 398 is fixed to a shaft 400 having a gear 402 mounted on its outer end. This latter gear 402 serves, through an idler gear 404, to drive a gear 406 mounted on a shaft 408 which is similarly carried by the frame of a differential assembly 410. The output of the differential assembly 410 is in the form of a pinion 412 mounted on a sleeve 414 carrying a gear 416 which meshes with a gear 418 mounted on the shaft 200. A reset motor M4 is connected through a worm gear 420, worm wheel 422 and gears 424, 426 and 428 to a pinion 430 which constitutes an input member for the differential assembly 410 for resetting purposes.

The function of the differential assembly 410 is to provide a means for driving or resetting the X-drive shaft 164 (Fig. 6) in order that either the bomb control drive passing through gears 402, 404 and 406 from the differential assembly 340 or the reset operations from the X-reset motor M4 may be made effective without necessitating disengaging the gear drive from the differential assembly 340 by the provision of additional clutch mechanism.

When the computer mechanism is in operation during the fall of a bomb, the drive which represents control of the aircraft and which tends to reduce the forward velocity of the latter when heading is changed from the initial heading, will be transmitted through the gears 402, 404 and 406 from the differential assembly 340. During this time, the reset motor M4 and its associated gears 420, 422, 424, etc., are stationary. Under these conditions, the frame of the differential member 410 will rotate under the full direct drive of the gear 406 and the gears 412 and 416 will be driven at a speed which is twice the speed of the gear 406. Suitable gear reductions are provided in order that the X-drive shaft 164 will be driven at the correct speed to indicate the projection of the positions of the aircraft and the bomb on the X—X axis, which is the initial heading of the aircraft. These reductions are provided by the gears 416 and 418 and also by a gear assembly designated in its entirety at 432 and interposed in the shaft 200.

It should be noted at this time by reference to Fig. 6 that the bevel gears 162 and 160 in the triangle unit 14 provide for driving the X-lead screw 118 from the X-drive shaft 164 at a predetermined ratio wherein one revolution of the X-drive shaft arbitrarily represents a distance of 83⅓ feet and one revolution of the X-lead screw represents a distance of 125 feet, these ratios being commensurate with the various other arbitrarily assumed conditions in the training apparatus.

The lateral displacement component of motion of the Y-drive shaft 142 of Fig. 6, which is coupled to the output shaft 202 by the sleeve 176 should be zero, or, in other words, the Y-drive shaft should remain motionless during the fall of a bomb when no control is applied to either the aircraft or to the bomb. To this end, normally the integrator mechanism shown in Fig. 8 for computing sine and cosine values of aircraft heading would have the sine roller 270 positioned at the center of the aircraft integrator disc 272 to represent the flight of the aircraft on its initial heading so that rotation of the disc will not effect movement of this roller. With such an arrangement of parts, the sine roller 270 and the azon integrator drive roller 240 will occupy positions in the center of their respective driving discs 272 and 210 respectively for a large percentage of operating time. Under these conditions, satisfactory operation may be attained but by means of the arrangement shown in Fig. 11, which is a modified arrangement, a somewhat better driving relationship exists between the various parts just described in that the two rollers 270 and 240 are displaced equal amounts in opposite directions from the center of their respective discs. Since the aircraft integrator computer disc 272 and the azon integrator computer disc 210 are driven at the same rate of speed, and since both of the outputs from these integrators are fed to the differential 268, there will be no motion of the differential shaft 296 or of the output gear 298 when the two drive rollers are rotating at the same speed and driving the differential gears 266 and 290 in the opposite direction. Such an arrangement affords somewhat better torque characteristics and reduces wear at the center of the two computer discs.

Each integrator disc 272 and 210 has a relatively large diameter working surface and in both instances the respective take-off rollers 270 and 240 are always positioned at some point offset from the center of its disc, as shown in Fig. 11. The sine disc 360 will rotate in a clockwise direction during turning movement of the aircraft to the right and under these conditions the driving pin 364 will shift toward the left and when the aircraft has completed its turn, the roller will be displaced from the center of the disc 272 a distance which may be expressed as $d + \sin \theta d$ where $d$ = the initial displacement and the angle $\theta$ equals the angle of deviation of turn of the aircraft from its initial heading. A left turn will result in decreasing the initial displacement of the sine roller and the roller will be shifted toward the center of the integrator disc 272 so as to have a final displacement of $d - \sin \theta d$.

Similarly, the azon integrator disc 240, which is supported on the spline shaft 242, will be shifted toward the right to increase the initial displacement dimensions when right control is applied to the azon bomb and it will be shifted to the left when left control is applied to the bomb according to the geometric formulae given above.

The azon integrator disc 210 is driven by a motor M1 at a speed of 80 revolutions per minute through worm gearing 434 and gears 436 and 438. The shaft 440 on which the gear 436 is mounted supports one element of a clutch 442. The other element of the clutch is carried on a shaft 444 which, by means of worm gearing 446, serves to rotate a shaft 448 having at one end thereof a gear 450 which drives a gear 452. The gear 452 is secured to the frame of a differential assembly designated in its entirety at 454.

A timer reset motor M5 is adapted to drive a train of gearing, including a worm gear 456 and gears 458, 460, 462, 464, 466, 468 and 470, the latter gear being mounted on a sleeve 472 provided with a pinion 474 thereon which constitutes one input element of the differential assembly 454.

The timer reset gearing just described is normally locked when resetting operations are not in effect and under these conditions, upon energization of the clutch 442 when the gearing 450, 452 is being driven, the drive will be transmitted through the various differential pinions directly to the output pinion 476 and from thence through gears 478, 480 and 482 to a shaft 484 having mounted thereon a pair of bevel gears 486 and 488.

The gear 488 serves to drive the timer unit mechanism shown in Fig. 9, and this latter timer mechanism controls the rate of lateral acceleration of an azon bomb in a manner that will be described presently. The shaft 484 also has mounted thereon at one end thereof a bevel gear 489 which serves to drive a second bevel gear 490 secured to a shaft 492. The shaft 492 carries a bevel gear 494 which meshes with a bevel gear 496 mounted on the altitude or gravity cam drive shaft 204. The primary function of the drive through the gearing 488, 490, the shaft 492 and gearing 494, 496, is to rotate the gravity cam 108 in the triangle unit 14 which, it will be remembered, functions to control the lowering of the lead screw carriage 88 in order that the level of this carriage frame at all times during the fall of the bomb will faithfully represent the relative position of the bomb.

Referring now to Fig. 9, the timer control unit assembly shown in this figure is, for convenience, removably associated with the remainder of the apparatus. This assembly is designed in its entirety at 17. Its proper position in the schematic representation of the computing mechanism shown in Figs. 7, 8 and 9, is within the space bounded by the shafts 256, 444, 448 and the reset assembly under the control of the motor M5 as indicated by the rectilinear, closed, dotted line polygon designated at 17 in Fig. 7.

The timer control unti 17 is in the form of a cam controlled rack and pinion differential mechanism, the function of which is to displace the acceleration drive roller 212, which moves across the face of the azon integrator disc 210 and thus controls the drive to the lateral velocity lead screw 116 through the various differential gearing mechanisms 268 and 304, as previously described. It is to be noted that the drive roller 212 and its cage member 216 are illustrated in both Figs. 7 and 9, thus giving an accurate indication of how this latter figure is oriented with respect to the former figure when the mechanism 17 is assembled in the computer unit.

It is to be noted that the previously mentioned α cam and Δα cam are associated with the timer unit 17. The α cam is designated at 500, while the Δα cam is designated at 502. These two cams are mounted upon a shaft 504 which is driven through the bevel gearing 486, 488 (see both Figs. 7 and 9) from the shaft 484.

It is obvious that the position of the drive roller 212 with respect to the azon integrator disc 210 is a function of the variable trajectory of a falling azon bomb and that the various increments of motion of the roller relative to the driving disc depend upon the application of right or left azon control or of no azon control to the bomb at predetermined periods of time and for predetermined lengths of control. The differential mechanism of the timer unit shown in Fig. 9, whose function is to displace the acceleration drive roller 212, operates at all times under the control of the α cam 500 and at certain times additionally under the control of the Δα cam 502 only when lateral control is being applied to the azon bomb in one direction or the other. During such periods of azon control, the α cam and the Δα cam function differentially to displace the roller 212 and when such control is terminated, the Δα cam relinquishes its function at the differential arrangement and restores control of the roller 212 to the α cam alone.

Generally speaking, the fall of an azon bomb may be caused within certain approximations to be merely a perturbation of a free fall case. Azon rudder action is assumed to affect lateral displacement of the bomb, the descent and forward motion being unaffected. An early application of right or left azon control to the projectile when the latter has not attained a relatively high downward velocity will differ materially from a later application of azon control to the projectile when the latter has attained a relatively high downward velocity. Using the velocities obtained from a free fall case, the lateral accelerations produced by azon rudder action at any point along the bomb's trajectory may be calculated directly. This lateral function is hereinafter referred to as $\alpha(t)$. The α cam 500 is designed in accordance with the free fall case where no azon rudder control is applied and may, therefore, be termed simply as an acceleration cam, its function being applied to the differential mechanism at all times whether control is or is not being applied to the bomb. Where azon control is applied to the bomb, the lateral displacement of the latter is the double integral of the acceleration function represented by the α cam multiplied by another function representing time and duration of rudder application. This function is hereinafter referred to as $r(t)$. The lateral displacement, corresponding to any time $t$ after release of the bomb is then given by $$\int_0^t \int_0^t r(t)\alpha(t)\,dt\,dt$$

where $r(t)$ represents the + or − fraction of the maximum right rudder applied to the azon bomb as a function of time and $\alpha(t)$ represents the normal acceleration function in the free fall case.

Stated otherwise, the function $\alpha(t)$ may be said to define the potential acceleration of the azon bomb for full right rudder control applied at any time during flight provided no previous control has been applied. $r(t)$ is the absolute value of the rudder deflection.

In the utilization of the α cam and the Δα cam in the rack type differential unit, the α cam places an input into the differential, while the Δα cam remains ineffective except during such periods of time as control is applied to the bomb. During such periods of time, the Δα cam is employed to subtract from the input of the α cam. Stated in still another manner, the α cam serves to apply increasing increments of lateral motion to the acceleration roller 212 at all times, while the Δα cam serves to subtract increments of motion from those being applied by the α cam but only when lateral control is being applied by the bombardier.

Various methods have been proposed for developing azon trajectories and for cutting the α and Δα cams 500 and 502 respectively. One method assumes that the forward motion and descent of the bomb is unaffected by rudder control which causes only lateral displacements. It further assumes that an acceleration function $\alpha(t)$ can be defined for all azon bombs dropped from a given altitude and with a given velocity. The function represents the lateral acceleration experienced by the bomb when full right rudder is applied. When full left rudder is applied, the magnitude of the acceleration is the same but its sign is the opposite. Intermediate rudder displacements produce proportional accelerations. The lateral displacement of the bomb is then given by $$\int_0^t \int_0^t \alpha(t) r(t) dt dt$$

where $r(t)$ represents the + or − fraction of the maximum right rudder applied to the azon bomb as a function of time.

This method is somewhat inaccurate if control is applied during a large part of the flight of the bomb because then the value of $\alpha(t)$ is decreased as a result of this application. This amount of decrease is dependent mainly on the time and duration of the control applied, regardless of whether it is right or left control. A general study of the character of this decrease in $\alpha(t)$ shows that it is possible to define a more accurate acceleration function $\alpha(t)'$ such that:

$$\alpha(t)' = \alpha(t) - \int_0^t \Delta\alpha(t) \cdot [r(t)] dt$$

where $\alpha(t)$ defines, as before, the acceleration possible if full right control is applied at any time in flight, provided no previous control has been applied.

$\Delta\alpha(t)$ defines the rate of decrease in $\alpha(t)$ which results whenever full rudder control is applied, whether the control is right or left.

$[r(t)]$ is the absolute value of the rudder deflection. (For this purpose, it is quite satisfactory to neglect the 0.6 second time taken by the rudders to deflect to full value. In other words $[r(t)]$ may be considered to have a value of either 1 or 0.)

The displacement of the bomb is then given by:

$$\int_0^t \int_0^t \alpha(t)' \cdot r(t) dt dt$$

The mechanical method proposed for generating $\alpha(t)'$ requires no integrators. The two functions $$\alpha(t) \text{ and } \int_0^t \Delta\alpha(t) dt$$

are cut on cams controlling the rotation of two shafts which are subtracted from one another by a differential gear. The motion of the $\Delta\alpha(t)$ input shaft is not continuous but is clutched in and out accordingly as either right or left control is or is not applied. The rotation of the output shaft from the differential gear gives directly $\alpha(t)'$.

The definition of $\alpha(t)$ and $\Delta\alpha(t)$ has been carried out semi-empirically by studying accelerations found in pre-computed azon trajectories. The function of $\alpha(t)$ is computed directly from velocities given for a free fall case. The function $\Delta\alpha(t)$ is obtained by taking the difference between $\alpha(t)$ and the actual accelerations found when rudder control is applied. The functions $\alpha(t)$ and $\Delta\alpha(t)$ are then plotted and the results are given in the following table:

Table

| t | $\alpha(t)$ | $\Delta\alpha(t)$ |
|---|---|---|
| 0 | 3.63 | 0 |
| 1 | 3.65 | 0 |
| 2 | 3.71 | 0 |
| 3 | 3.80 | .01 |
| 4 | 3.98 | .02 |
| 5 | 4.20 | .05 |
| 6 | 4.50 | .08 |
| 7 | 4.85 | .13 |
| 8 | 5.27 | .20 |
| 9 | 5.77 | .28 |
| 10 | 6.30 | .37 |
| 11 | 6.93 | .48 |
| 12 | 7.60 | .60 |
| 13 | 8.34 | .76 |
| 14 | 9.14 | .92 |
| 15 | 10.00 | 1.13 |
| 16 | 10.95 | 1.34 |
| 17 | 11.93 | 1.61 |
| 18 | 12.98 | 1.89 |
| 19 | 14.16 | 2.23 |
| 20 | 15.38 | 2.66 |
| 21 | 16.68 | 3.13 |
| 22 | 18.05 | 3.66 |
| 23 | 19.54 | 4.28 |
| 24 | 21.12 | 4.95 |
| 25 | 22.75 | 5.75 |
| 26 | 24.45 | 6.62 |
| 27 | 26.22 | 7.58 |
| 28 | 28.04 | 8.59 |
| 29 | 29.95 | 9.70 |
| 30 | 31.96 | 10.93 |
| 31 | 33.96 | 12.26 |
| 31.85 | 35.80 | 13.44 |

The $\alpha$ cam and the $\Delta\alpha$ cam may be constructed directly from the expressions given above in conjunction with the table.

Figure 5:
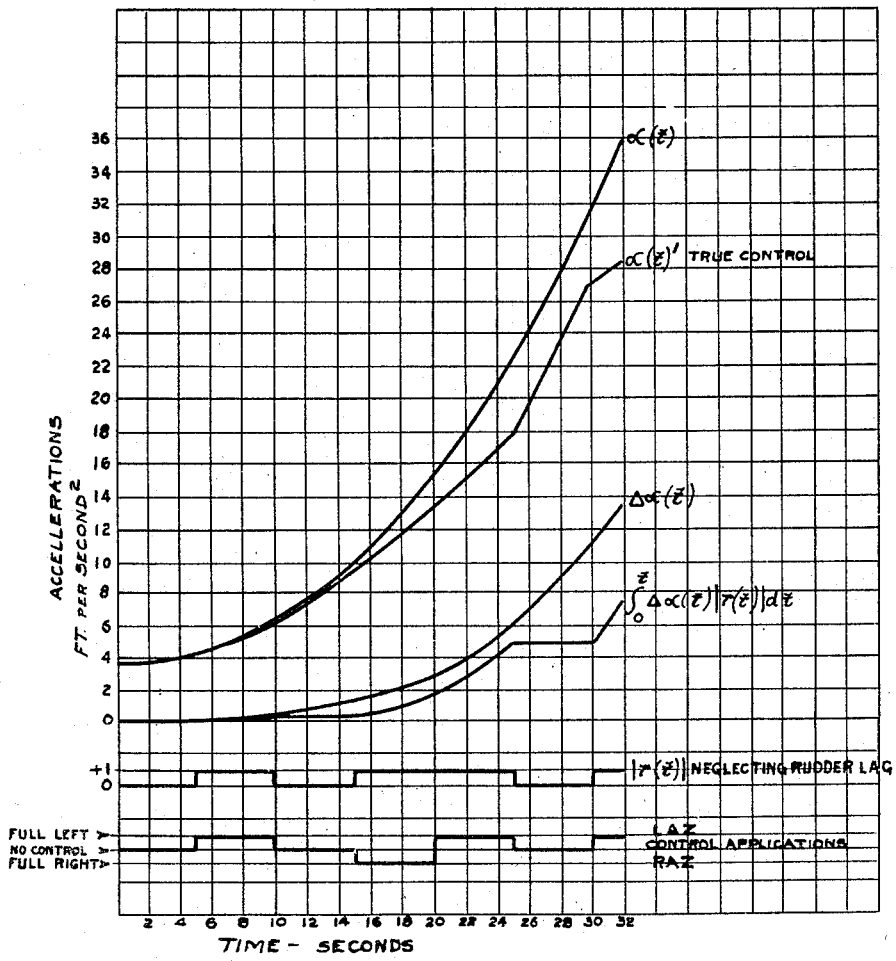
Fig. 5 is a diagrammatic view in graph form showing the variation in the position of an azon-controlled bomb for a predetermined typical rudder control schedule.

Fig. 5 is a graph wherein $\alpha(t)$, $\Delta\alpha(t)$ and the resultant $\alpha(t)'$ functions are plotted for an assumed typical rudder control schedule. The lower line in this chart shows the application of left and right azon rudder control as indicated by the designations LAZ and RAZ. The next line above in the chart shows the absolute value of rudder deflection. For this purpose, it is quite satisfactory to neglect the short period of time required for movement of the rudders from an initial deflection to a full value deflection. In other words, $r(t)$ may be considered to have a value of either 1 or 0. The curve $\alpha(t)$ represents the $\alpha$ cam 500 and is a function of a free fall case. The curve $\Delta\alpha(t)$ represents the cam 502 and is a potential acceleration function which must be subtracted from the first or $\alpha$ acceleration function when, and only when, rudder control is applied in either direction. In the particular problem illustrated, the rudder control schedule is as follows:

|  | Seconds |
|---|---|
| No azon rudder control | 0–5 |
| Full left azon control | 5–10 |
| No rudder control | 10–15 |
| Full right azon rudder control | 15–20 |
| Full left azon rudder control | 20–25 |
| No azon control | 25–30 |
| Full left azon control | 30+ |

The curve $$\int_0^t \Delta\alpha(t)[r(t)] dt$$

represents the application of control to the azon bomb as contained in the schedule of control applications selected for the particular problem at hand. Thus, during the 0–5 second interval, the 10–15 second interval and the 25–30 second interval when no control is being applied, this curve exists as a horizontal line in each instance. During the intervening times when control is being applied, the application of such control is graphically illustrated by a series of curved fragments substantially parallel to the $\Delta\alpha(t)$ curve. The curve $\alpha(t)'$ represents true control and it will be seen that this curve is a direct function of the $\alpha(t)$ acceleration curve and the integrated curve just described, which is in accordance with the previously given formula $$\alpha(t)' = \alpha(t) - \int_0^t \Delta\alpha(t) \cdot [r(t)] dt$$

Referring now to this latter curve $\alpha(t)'$, which represents true azon control, it will be seen that up until the duration of the first five-second interval when no control is applied, the $\alpha(t)$ and $\alpha(t)'$ are identical and coincide. Immediately upon application of full left azon control at the commencement of the 5–10 second interval, a potential acceleration shown by the $\Delta\alpha(t)$ curve has accrued which, when applied as a decrease in acceleration, is represented by that portion of the curve $\alpha(t)'$ existing between the 5–10 second vertical graph lines. During such lack of control as occurs in the 10–15 second interval, it is to be noted that the portion of the curve $\alpha(t)'$ runs parallel to the $\alpha(t)$ curve. Again, during the 15–20 second interval when right azon control is applied, the $\alpha(t)'$ drops off as before, since right and left control results in equal deceleration. The curve continues to drop off during application of left azon control during the 20–25 second interval, after which it runs parallel to the $\alpha(t)$ curve until the commencement of left azon control at the 30-second interval, at which time it commences to again drop off. It will be understood that in the above illustrations rudder lag has been entirely neglected.

From the above description, it is thought that the nature and function of the $\alpha$ cam and $\Delta\alpha$ cam will be appreciated and reference may again be had to Fig. 9 for a full understanding of the nature of the differential mechanism with which these two cams are associated. The shaft 504, upon which these cams are mounted, is adapted to be driven from the bevel gears 486, 488, as previously described. The $\alpha$ cam 500 has associated therewith a cam follower 506 mounted on a toothed rack 508 which is slidable laterally of the shaft 504. The rack 508 meshes with a differential pinion 510 rotatably mounted on a shaft 512 connected to the cage 216, the position of which determines the lateral position of the roller 212 relative to the face of the azon integrator disc 210. The pinion 510 also meshes with a second rack 514 which is movable laterally and which is provided with a series of teeth on the upper side thereof in meshing engagement with a gear 516. The gear 516 meshes with a gear 518 mounted on a shaft 520 to which there is splined a dual clutch member 522. The dual clutch member 522 is designed for selective engagement with a stationary brake member 524 and a cooperating movable clutch member 526 mounted on a shaft 528.

Movement of the intermediate clutch member 522 into engagement with the stationary brake surface 524 or with the clutch member 526 is effected under the control of a pair of magnets LR and BR respectively. The two magnets LR and BR jointly control the motion of a yoke member 530 having an armature 531, the operation being that when the magnet LR is energized, the clutch member 522 will move into engagement with the cooperating clutch member 526, and that when the magnet BR is energized the clutch member 522 will move into engagement with the braking member 524.

As previously stated, the position of the pinion 510 controls the position of the cage 216, which in turn controls the lateral displacement of the roller 212 on the face of the azon integrator disc 210. This roller is displaced along the face of the disc to increase the potential acceleration rate. This rate is not applied to the displacement of the velocity lead screw 116 (Fig. 6) until control is applied to the bomb by energizing either the left azon control magnet LAZ or the right azon control magnet RAZ, shown in Fig. 10. When such control is applied in either direction, the brake magnet BR will be deenergized and the acceleration control magnet LR will be energized. The yoke member 530 will thus be shifted and the clutch member 522 will be clutched to the member 526 supported on the shaft 528. Upon such clutching engagement between the members 522 and 526, the shafts 520 and 528 will rotate in unison under the influence of the $\Delta\alpha$ cam 502 through mechanism that will now be set forth in detail.

It is to be understood that the $\alpha$ cam 500 and $\Delta\alpha$ cam 502 are moved in unison and that the application of the effect of the latter cam is not applied to or felt by the differential pinion 510 until such time as control is applied to the bomb and either of the magnets LAZ or RAZ are energized accompanied by energization of the magnet LR. To this end, the $\Delta\alpha$ cam 502 has associated therewith a cam follower 532 mounted on a slidable rack 534 having teeth thereon which mesh with a gear 536. The gear 536 transmits motion through gears 538 and 540 to the shaft 528.

From the above description, it will be seen that the timer mechanism 17 just described may aptly be termed a memory device, in that it stores in its internal mechanism functions that bear a direct relation to the history of control that has been applied to a particular bomb from the time it was released until the time of impact. The $\alpha$ cam and the $\Delta\alpha$ cam are continuously driven under the influence of the bevel gears 486, 488, at all times during the time of fall of the bomb. The $\alpha$ cam, being an acceleration cam cut according to known considerations of gravity, functions at all times to apply constantly increasing increments of lateral motion to the acceleration roller 212 relative to the axis of the azon integrator disc 210. This cam function in its normal manner whether control is or is not applied to the bomb. It is the cam which is based upon the free fall curve labeled $\alpha(t)$ shown in the previously discussed graph of Fig. 5. During the fall of the bomb when no azon control is applied thereto, the brake magnet BR is energized and the dual clutch member 522 is in engagement with the brake member 524 so that the rack 514 is effectively locked in a fixed position, thus allowing full effect of the movement of the $\alpha$ cam 500 to be applied to the pinion 510 and, consequently, to the acceleration roller 212. During this time, the $\Delta\alpha$ cam 502 will continue to rotate, thus shifting the position of the rack 534 and operating through the gear train 536, 538 and 540 to drive the shaft 528. Rotation of the shaft 528 during this time of no control, however, is meaningless, inasmuch as it is not clutched to the shaft 520. In this manner, potential acceleration is being built up or stored in the apparatus ready for instant application to the shaft 520 and rack 514 when future control is applied to the bomb. Immediately upon such application of control at any point during the fall of the bomb, the two shafts 528 and 520 are clutched together, thus permitting movement of the rack 514 to apply a differential motion to the pinion 510 which is counter to the motion of the rack 508 which is operated under the influence of the α cam 500.

In Fig. 12 the partially schematic representation of the computer mechanism shown in Figs. 7 to 11 inclusive is shown in almost complete schematic form. In this latter figure, the application of reference characters to the corresponding parts shown in these former figures has been carefully preserved. This schematic view shows only the basic driving and computer elements including aircraft control mechanism, azon bomb control mechanism and devices employed for computing lateral acceleration rates, together with differentials and reset driving mechanism. It is believed that Fig. 12, although not absolutely essential to an understanding of the computer mechanism, will be helpful in giving a general over-all picture of the apparatus.

The azon motor M1 and the aircraft motor M2 constitute the primary source of power for the computer mechanism and are driven at a velocity commensurate with the selected airspeed of 250 miles per hour, thus serving to rotate the azon integrator disc 210 and the aircraft integrator disc 272 at a constant speed of 80 revolutions per minute. It will be understood that in the actual construction of the apparatus, and as illustrated in Figs. 7 and 8, each of the integrator discs 210 and 272 is in the form of a single disc, the opposite sides of which are employed as driving surfaces for driving the rollers 212, 240 and 374, 270 respectively. In the schematic representation of Fig. 12, the lateral rate integrator disc 210 is illustrated as being in the form of two elements 210A and 210B, the disc 210A representing the front side of the disc 210 in Fig. 7 which drives the roller 212, and the disc 210B representing the rear side which drives the roller 240. The sine-cosine aircraft integrator disc 272 of Fig. 8 is also shown in the form of two discs 272A and 272B in Fig. 12, the former representing that side of the disc 272 which drives the roller 374, and the latter representing that side of the disc 272 which drives the roller 270.

The aircraft heading input jack shaft 356 is operatively connected to the bombsight stabilizer and the projector unit of the parent training apparatus through the clutch 346. This shaft serves to control the turning movements of the sine and cosine discs 360 and 342 respectively. Each of these discs controls the movement of the Scotch yoke members 368 and 366 respectively to position the take-off rolls of the roller and disc type integrators. The take-off sine roller is shown in Fig. 6 at 270 and the cosine roller is shown at 374. The left-hand drive 272A, 374, shown in this figure controls the cosine component of aircraft heading and the right-hand drive 272B, 270 controls the corresponding sine component of aircraft heading.

The motor M2 affords a drive for the aircraft integrator disc 272A, 272B and also provides a drive into one side of the X-drive differential assembly 340 to impart a constant component of trail, as previously described. It is to be noted at this point that initial trail is introduced at the triangle unit by initially offsetting the projector tube 10 to a position corresponding to bomb trail at the time of bomb impact. This angle is assumed to be constant and the assumption is sufficiently accurate for observation purposes at all times after the initial illumination of the projector, which occurs six seconds after the release of the bomb from the aircraft. The constant trail component and the integrated cosine component of aircraft heading introduced into the differential 340 results in an output which is fed to one input side of the differential assembly 410 and from thence it is fed through the X-drive shaft 200 to the computer unit to control the fore and aft motion of the projector 10. It is to be noted that the reset motor M4 normally remains deenergized, since this motor is employed solely for reset purposes to restore the X-drive shaft to its normal position prior to each cycle of operation. The output from the differential 340 thus passes through the differential assembly 410 unaltered during normal machine operations.

The aircraft motor M1 is employed to drive the integrator disc 210A, 210B, this disc, as in the case of the integrator disc 272, being shown in dual fashion. It is also geared to the shaft 440 leading to the differential assembly 454 from which the α cam and the Δα cam 500 and 502 respectively in the timer unit 17 are driven and from which the gravity cam 108 is driven. Each of these cams 500, 502 and 108 is designed to rotate during the time of fall of the bomb. It is assumed that all elements will be reset to normal positions prior to release of the bomb and under these conditions the cosine disc 342, representing the cosine of aircraft heading, will be so positioned that the cosine roller 374 will occupy a position adjacent the periphery of the aircraft integrator disc 272, while the sine disc 360 will be so positioned that the sine roller 270 occupies a position adjacent the center of the integrator disc 272.

The motors M1 and M2 are brought to full speed prior to release of the bomb and the input to both sides of the differential 340 will not affect the output as long as the sine and cosine discs 360 and 342 do not deviate from their initial positions. The clutch 346 is adapted to become engaged at the instant of bomb release simultaneously with the engagement of the timer clutch 442 and the Y-clutch 143 associated with the Y-drive shaft 142 in the output drive from the differential assembly 304. The disc 210A, 210B is employed to drive the take-off rollers 212 and 240 respectively. The position of the roller 212 is controlled during the cycle when no azon rudder control is applied to the bomb by means of the α cam 500 in the timer mechanism 17 and this control is adapted to be modified at any time whenever rudder control is applied to the bomb. One effect of such application of control to the bomb is to cause the clutch 522 to become engaged under the influence of the magnet LR (Fig. 9) in order that the action of the α cam 500 may be modified by the action of the Δα cam 502 which will reduce the speed at which the roller 212 is displaced. The combination of the α cam and Δα cam continues to remain in effect as long as control is applied. When control is no longer applied, the clutch 522 is released and the α cam again assumes control.

The output drive from the roller 212 extends to the clutches LAZ and RAZ, which are driven in opposite directions. Upon engagement of either one of these clutches, the drive will be transmitted in either direction to the azon velocity lead screw 238, which will result in a change in position of the roller 240 to either increase or decrease the rate of drive through the two differentials 268 and 304 to the lateral displacement drive shaft 202, 142.

The reset motor M5 is designed to drive through the differential assembly 454 to restore the α cam and Δα cam and the gravity cam 188 to their respective normal positions. The timer clutch 442 will be disengaged during reset operations. The resetting of the lead screw 238, which controls the position of the roller 240, is effected under the control of the motor M1 by selectively energizing the clutches LAZ and RAZ.

It is obvious that in a machine of this character, because of the varied nature of the problems that may be set up, reset operations cannot be effected by the simple procedure of reversing the motion of the instrumentalities involved during any particular bombing procedure since certain of these instrumentalities will return to their normal positions prior to others. Certain selected resetting operations must be resorted to. However, the present invention is not essentially concerned with problems of reset and, as a consequence, no description thereof is made herein. It is deemed sufficient to state that the contact groups 172 and 152 associated with the discs 66 and 144 respectively (Fig. 6) are employed for reducing the speed of the motor M3 when these rods approach their home positions at relatively high speed during such resetting operations.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. In a training apparatus of the character described, a support mounted for rotation about a vertical axis, a light beam projector pivotally suspended from said support and capable of universal swinging movement toward and away from the vertical axis of the support in both lateral and longitudinal directions relative to the support, a cable connected to said projector for imparting longitudinal components of swinging movement thereto, a second cable connected to the projector for imparting lateral components of swinging movement thereto, a pair of depending rods each mounted for swinging movement about a horizontal axis, said cables being connected to respective rods, a vertically movable carriage, a pair of lead screws mounted for rotation in said carriage, a block threadedly connected to each lead screw and movable therealong in either direction upon turning of the latter, means carried by each block for engaging a respective rod to swing the same in one direction or another upon movement of the block, means for rotating said lead screws independently of each other, and means for imparting accelerated downward vertical components of movement to said carriage.

2. In a training apparatus of the character described, a support mounted for rotation about a vertical axis, a light beam projector pivotally suspended from said support and capable of universal swinging movement toward and away from the vertical axis of the support in both lateral and longitudinal directions relative to the support, a cable connected to said projector for imparting longitudinal components of swinging movement thereto, a second cable connected to the projector for imparting lateral components of swinging movement thereto, a pair of depending rods each mounted for swinging movement about a horizontal axis, said cables being connected to respective rods, a vertically movable carriage, a pair of lead screws mounted for rotation in said carriage, a block threadedly connected to each lead screw and movable therealong in either direction upon turning of the latter, means carried by each block for engaging a respective rod to swing the same in one direction or another upon movement of the block, means for rotating said lead screws independently of each other, a vertically disposed rack mounted on said carriage and movable therewith, a rotatable horizontal shaft, a pinion mounted on said shaft and meshing with said rack, a second pinion mounted on said shaft, a reciprocable rack meshing with said latter pinion, a rotatable cam, a roller mounted on said last mentioned rack, means normally maintaining said roller in engagement with said cam, and means for rotating said cam.

3. In a training apparatus of the character described including means for simulating an indication of an azon-controlled bomb released from an aircraft in flight and controlled as to azimuth and viewed from the aircraft, an integrating apparatus for computing the net lateral displacement of the bomb relative to the aircraft with respect to the line of original heading of the aircraft at the time of bomb release, said integrating means comprising an aircraft integrating disc, means for rotating said disc at a predetermined constant rate of speed; a take-off roller engaging one face of the disc, a spline shaft upon which the roller is slidably disposed, said shaft extending across the face of the disc, cam control means for shifting the position of said roller on said spline shaft radially of the disc, means for actuating said cam control means to effect radial displacement of the roller in accordance with the deviation of the aircraft from its initial heading to cause the roller to be driven by the disc at a rate proportional to the sine of the angle of deviation of the aircraft from its original heading, an azon integrating disc, means for rotating said latter disc at a predetermined constant rate of speed, a second take-off roller engaging one face of said latter disc, cam control differential means for shifting said latter roller in one direction radially of the disc to effect radial displacement of the roller in accordance with the lateral displacement of the bomb as a function of the time and extent of control applied to the latter during its period of fall, said cam control differential means comprising an acceleration cam operable to cause accelerated shifting of said second roller at all times during the fall of the bomb, a lateral acceleration control cam, and means operable when control is applied to the bomb for causing said lateral acceleration control cam to differentially modify the shifting action of said acceleration cam.

4. In a control device of the character described, in combination, a differential mechanism including a pair of input elements each in the form of a longitudinally shiftable rack, a differential rack, a longitudinally shiftable output element whose shifting movement is a function of the combined movements of the two input elements, a differential pinion carried by said output element and meshing with said differential rack and one of said shiftable racks, a second idler pinion meshing with said other shiftable rack, a third idler pinion meshing with said differential rack, normally disengaged manually controlled clutch means connecting said last two mentioned pinions in driving relationship, a rotary cam shaft, a cam follower on each of said movable racks, a cam mounted on said cam shaft and cooperating with the cam follower on said first mentioned shiftable rack, a second cam on said cam shaft cooperating with said other cam follower, each of said cams having a contour operable upon rotation of the cam shaft to apply an accelerating longitudinal motion to its respective movable rack, and means for rotating said cam shaft.

GEORGE F. DALY.
BURDETTE H. PHILLIPS.
GUSTAV V. A. MALMROS.

REFERENCES CITED

The following references are of record in the file of this patent:

UNITED STATES PATENTS

| Number | Name | Date |
| --- | --- | --- |
| 1,625,678 | Parsons | Apr. 19, 1927 |
| 1,662,272 | Klopsteg | Mar. 13, 1928 |
| 2,066,949 | Ruiz | Jan. 5, 1937 |
| 2,345,744 | Glenny | Apr. 4, 1944 |
| 2,385,952 | Svoboda | Oct. 2, 1945 |
| 2,388,680 | Dawson | Nov. 13, 1945 |
| 2,392,142 | Gosswiller | Jan. 1, 1946 |
| 2,403,117 | Peters | July 2, 1946 |
| 2,406,574 | Waller et al. | Aug. 27, 1946 |
| 2,412,356 | Roberts et al. | Dec. 10, 1946 |
| 2,418,512 | Johnson | Apr. 8, 1947 |
| 2,428,432 | Park | Oct. 7, 1947 |
| 2,444,549 | Anderson | July 6, 1948 |